US010385271B2

(12) United States Patent
Furusato et al.

(10) Patent No.: US 10,385,271 B2
(45) Date of Patent: Aug. 20, 2019

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yoshimasa Furusato, Chiba (JP); Masayuki Saito, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

(21) Appl. No.: 15/536,139

(22) PCT Filed: Nov. 19, 2015

(86) PCT No.: PCT/JP2015/082534
§ 371 (c)(1),
(2) Date: Jun. 15, 2017

(87) PCT Pub. No.: WO2016/098523
PCT Pub. Date: Jun. 23, 2016

(65) Prior Publication Data
US 2017/0369782 A1 Dec. 28, 2017

(30) Foreign Application Priority Data
Dec. 16, 2014 (JP) ................................. 2014-253983

(51) Int. Cl.
*G02F 1/1333* (2006.01)
*C09K 19/34* (2006.01)
*C09K 19/12* (2006.01)
*C09K 19/20* (2006.01)
*C09K 19/30* (2006.01)
*C09K 19/54* (2006.01)
*G02F 1/13* (2006.01)

(52) U.S. Cl.
CPC ...... *C09K 19/3402* (2013.01); *C09K 19/0208* (2013.01); *C09K 19/0216* (2013.01); *C09K 19/12* (2013.01); *C09K 19/20* (2013.01); *C09K 19/30* (2013.01); *C09K 19/3003* (2013.01); *C09K 19/3066* (2013.01); *C09K 19/3068* (2013.01); *C09K 19/322* (2013.01); *C09K 19/52* (2013.01); *C09K 19/54* (2013.01); *G02F 1/13* (2013.01); *G02F 1/1337* (2013.01); *C09K 2019/0466* (2013.01); *C09K 2019/0496* (2013.01); *C09K 2019/123* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3019* (2013.01); *C09K 2019/3021* (2013.01); *C09K 2019/3025* (2013.01); *C09K 2019/3077* (2013.01); *C09K 2019/3083* (2013.01);
(Continued)

(58) Field of Classification Search
CPC ............ C09K 19/3402; C09K 19/0208; C09K 19/0216; C09K 19/12; C09K 19/20; C09K 19/30; C09K 19/3003; C09K 19/3066; C09K 19/3068; C09K 19/322; C09K 19/52; C09K 19/54; C09K 2019/0466; C09K 2019/0496; C09K 2019/123; C09K 2019/3004; C09K 2019/3009; C09K 2019/301; C09K 2019/3015; C09K 2019/3016; C09K 2019/3019; C09K 2019/3021; C09K 2019/3025; C09K 2019/3077; C09K 2019/3083; C09K 2019/3422; C09K 2019/3425; G02F 1/13; G02F 1/1333; G02F 1/1337; G02F 1/1362
USPC ...................................... 252/299.63
See application file for complete search history.

(56) References Cited

U.S. PATENT DOCUMENTS 6,846,523 B2 * 1/2005 Manabe ................ C09K 19/44
252/299.63
9,790,428 B2 * 10/2017 Gotoh .................... C09K 19/30
(Continued)

FOREIGN PATENT DOCUMENTS

JP S62-112131 5/1987
JP 2002-256267 9/2002
(Continued)

OTHER PUBLICATIONS

"International Search Report (Form PCT/ISA/210) of PCT/JP2015/082534", dated Feb. 16 2016, with English translation thereof, pp. 1-4.
(Continued)

*Primary Examiner* — Geraldina Visconti
(74) *Attorney, Agent, or Firm* — JCIPRNET

(57) ABSTRACT

To provide a liquid crystal composition having at least one or a suitable balance regarding two of characteristics such as high maximum or low minimum temperature of a nematic phase, small viscosity, suitable optical anisotropy, large dielectric anisotropy, large specific resistance, high stability to ultraviolet light or heat and a large elastic constant; and an AM device including the composition and having a short response time, a large voltage holding ratio, low threshold voltage, a large contrast ratio, a long service life and so forth. The liquid crystal composition contains a quencher as an additive component and a specific compound having large positive dielectric anisotropy as a first component, and a liquid crystal display device includes the composition. The composition may contain a specific compound having high maximum temperature or small viscosity as a second component, or a specific compound having negative dielectric anisotropy as a third component.

14 Claims, No Drawings

(51) Int. Cl.
  *G02F 1/1337* (2006.01)
  *C09K 19/02* (2006.01)
  *C09K 19/32* (2006.01)
  *C09K 19/52* (2006.01)
  *G02F 1/1362* (2006.01)
  *C09K 19/04* (2006.01)

(52) U.S. Cl.
  CPC ............... *C09K 2019/3422* (2013.01); *C09K 2019/3425* (2013.01); *G02F 1/1362* (2013.01)

(56) References Cited

U.S. PATENT DOCUMENTS

| | | |
|---|---|---|
| 2007/0104895 A1 | 5/2007 | Hotaka et al. |
| 2007/0108411 A1 | 5/2007 | Saito et al. |
| 2015/0184077 A1 | 7/2015 | Goetz et al. |

FOREIGN PATENT DOCUMENTS

| | | | | |
|---|---|---|---|---|
| JP | 2007-137921 | 6/2007 | | |
| JP | 2007-137986 | 6/2007 | | |
| JP | 2008-170497 | 7/2008 | | |
| JP | 2014-025025 | 2/2014 | | |
| JP | 2014025025 | * 2/2014 | ............ | C09K 19/54 |
| JP | 2014-040499 | 3/2014 | | |
| WO | 2006001444 | 6/2005 | | |
| WO | 2013182271 | 12/2013 | | |

OTHER PUBLICATIONS

"Office Action of Taiwan Counterpart Application," dated Jan. 21, 2019, with English translation thereof, p. 1-p. 11.

* cited by examiner

LIQUID CRYSTAL COMPOSITION AND LIQUID CRYSTAL DISPLAY DEVICE

CROSS-REFERENCE TO RELATED APPLICATION

This application is a 371 application of International PCT application serial no. PCT/JP2015/082534, filed on Nov. 19, 2015, which claims the priority benefit of Japan application no. 2014-253983, filed on Dec. 16, 2014. The entirety of each of the above-mentioned patent applications is hereby incorporated by reference herein and made a part of this specification.

TECHNICAL FIELD

The invention relates to a liquid crystal composition, a liquid crystal display device including the composition, and so forth. In particular, the invention relates to a liquid crystal composition having positive dielectric anisotropy, and an active matrix (AM) device that includes the composition and has a mode such as a TN mode, an ECB mode, an OCB mode, an IPS mode, an FFS mode or an FPA mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in two characteristics. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time in the device. A short response time is preferred for displaying moving images on the device. A shorter response time even by one millisecond is desirable. Accordingly, a small viscosity in the composition is preferred. A small viscosity at low temperature is further preferred. An elastic constant of the composition relates to a contrast of the device. In order to increase the contrast of the device, a large elastic constant in the composition is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

Optical anisotropy of the composition relates to a contrast ratio in the device. According to a mode of the device, large optical anisotropy or small optical anisotropy, more specifically, suitable optical anisotropy is required. A product (Δn×d) of the optical anisotropy (Δn) of the composition and a cell gap (d) in the device is designed so as to maximize the contrast ratio. A suitable value of the product depends on a type of the operating mode. In a device having a mode such as TN, a suitable value is about 0.45 micrometer. In the above case, a composition having the large optical anisotropy is preferred for a device having a small cell gap. Large dielectric anisotropy in the composition contributes to low threshold voltage, small electric power consumption and a large contrast ratio in the device. Accordingly, the large dielectric anisotropy is preferred. Large specific resistance in the composition contributes to a large voltage holding ratio and the large contrast ratio in the device. Accordingly, a composition having the large specific resistance at room temperature and also at a temperature close to the maximum temperature of the nematic phase in an initial stage is preferred. The composition having the large specific resistance at room temperature and also at a temperature close to the maximum temperature of the nematic phase even after the device has been used for a long period of time is preferred. Stability of the composition to ultraviolet light and heat relates to a service life of the liquid crystal display device. In the case where the stability is high, the device has a long service life. Such characteristics are preferred for an AM device use in a liquid crystal projector, a liquid crystal television and so forth.

In a liquid crystal display device having a polymer sustained alignment (PSA) mode, a liquid crystal composition containing a polymer is used. First, a composition to which a small amount of a polymerizable compound is added is injected into the device. Next, the composition is irradiated with ultraviolet light while voltage is applied between substrates of the device. The polymerizable compound is polymerized to form a network structure of the polymer in the composition. In the composition, alignment of liquid crystal molecules can be controlled by the polymer, and therefore the response time in the device is shortened and also image persistence is improved. Such an effect of the polymer can be expected for a device having the mode such as the TN mode, the ECB mode, the OCB mode, the IPS mode, the VA mode, the FFS mode and the FPA mode.

A composition having positive dielectric anisotropy is used in an AM device having the TN mode. A composition having negative dielectric anisotropy is used in an AM device having the VA mode. In an AM device having the IPS mode or the FFS mode, a composition having positive or negative dielectric anisotropy is used. In an AM device having a polymer sustained alignment (PSA) mode, a composition having positive or negative dielectric anisotropy is used. Compound (1-1) used in the invention is disclosed in Patent literature No. 1 described below.

CITATION LIST

Patent Literature

Patent literature No. 1: JP 2014-025025 A.

SUMMARY OF INVENTION

Technical Problem

One of aims of the invention is to provide a liquid crystal composition satisfying at least one of characteristics such as high maximum temperature of a nematic phase, low minimum temperature of the nematic phase, small viscosity, suitable optical anisotropy, large dielectric anisotropy, large specific resistance, high stability to ultraviolet light, high stability to heat and a large elastic constant. Another aim is to provide a liquid crystal composition having a suitable balance regarding at least two of the characteristics. Another aim is to provide a liquid crystal display device including such a composition. Another aim is to provide an AM device having characteristics such as a short response time, a large voltage holding ratio, low threshold voltage, a large contrast ratio and a long service life.

Solution to Problem

The invention concerns a liquid crystal composition that has a nematic phase and positive dielectric anisotropy, and contains at least one quencher as an additive component and at least one compound selected from the group of compounds represented by formula (2) as a first component, and a liquid crystal display device including the composition:

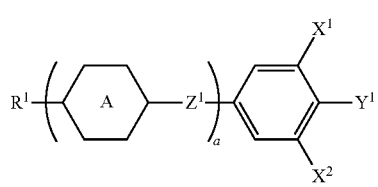

(2)

wherein, in formula (2), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine; and a is 1, 2, 3 or 4.

Advantageous Effects of Invention

An advantage of the invention is a liquid crystal composition satisfying at least one of characteristics such as high maximum temperature of a nematic phase, low minimum temperature of the nematic phase, small viscosity, suitable optical anisotropy, large dielectric anisotropy, large specific resistance, high stability to ultraviolet light, high stability to heat and a large elastic constant. Another advantage is a liquid crystal composition having a suitable balance regarding at least two of the characteristics. Another advantage is a liquid crystal display device including such a composition. Another advantage is an AM device having characteristics such as a short response time, a large voltage holding ratio, low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but to be mixed with a composition for the purpose of adjusting characteristics such as a temperature range of the nematic phase, viscosity and dielectric anisotropy. The compound has a six-membered ring such as 1,4-cyclohexylene and 1,4-phenylene, and has rod-like molecular structure. "Polymerizable compound" is a compound to be added for the purpose of forming a polymer in the composition.

The liquid crystal composition is prepared by mixing a plurality of liquid crystal compounds. A proportion (content) of the liquid crystal compounds is expressed in terms of weight percent (% by weight) based on the weight of the liquid crystal composition. An additive such as an optically active compound, an antioxidant, an ultraviolet light absorber, a dye, an antifoaming agent, the polymerizable compound, a polymerization initiator and a polymerization inhibitor is added to the composition when necessary. A proportion (amount of addition) of the additive is expressed in terms of weight percent (% by weight) based on the weight of the liquid crystal composition in a manner similar to the proportion of the liquid crystal compound. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having large specific resistance" means that the composition has large specific resistance at room temperature and also at a temperature close to the maximum temperature of the nematic phase in an initial stage, and the composition has the large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in the initial stage, and the device has the large voltage holding ratio at room temperature and also at a temperature close to the maximum temperature of the nematic phase even after the device has been used for a long period of time. In the composition and the device, the characteristics are examined before and after an aging test (including an accelerated deterioration test). An expression "increase the dielectric anisotropy" means that a value of dielectric anisotropy positively increases in a composition having positive dielectric anisotropy, and the value of dielectric anisotropy negatively increases in a composition having negative dielectric anisotropy.

A compound represented by formula (2) may be occasionally abbreviated as "compound (2)." At least one compound selected from the group of compounds represented by formula (3) may be occasionally abbreviated as "compound (3)." "Compound (3)" means one compound, a mixture of two compounds or a mixture of three or more compounds represented by formula (3). A same rule applies also to any other compound represented by any other formula. An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'."

A symbol of terminal group $R^1$ is used in a plurality of compounds in chemical formulas of component compounds. In the compounds, two groups represented by two pieces of arbitrary $R^1$ may be identical or different. For example, in one case, $R^1$ of compound (2-1) is ethyl and $R^1$ of compound (2-2) is ethyl. In another case, $R^1$ of compound (2-1) is ethyl and $R^1$ of compound (2-2) is propyl. A same rule applies also to a symbol of any other terminal group or the like. In formula (2), when a is 2, two of ring A exists. In the compound, two rings represented by two of ring A may be identical or different. A same rule applies also to two of arbitrary ring A when a is larger than 2. A same rule applies also to a symbol of $Z^2$, ring B or the like.

Alkyl is straight-chain alkyl or branched-chain alkyl, but includes no cyclic alkyl. Straight-chain alkyl is preferred to branched-chain alkyl. A same rule applies also to a terminal group such as alkoxy and alkenyl. With regard to a configuration of 1,4-cyclohexylene, trans is preferred to cis for increasing the maximum temperature. Then, 2-fluoro-1,4-phenylene means two divalent groups described below. In a chemical formula, fluorine may be leftward (L) or rightward (R). A same rule applies also to an asymmetrical divalent group faulted by removing two pieces of hydrogen from a ring, such as tetrahydropyran-2,5-diyl. A same rule applies also to a bonding group such as carbonyloxy (—COO— and —OCO—).

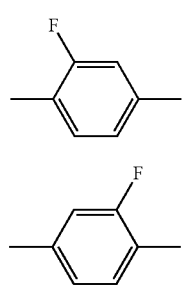

The invention includes items described below.

Item 1. A liquid crystal composition that has a nematic phase and positive dielectric anisotropy, and contains at least one quencher as an additive component and at least one compound selected from the group of compounds represented by formula (2) as a first component:

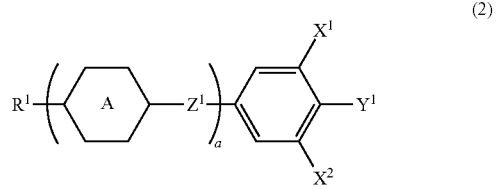

wherein, in formula (2), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine; and a is 1, 2, 3 or 4.

Item 2. The liquid crystal composition according to item 1, wherein the additive component is a nonaromatic compound having a conjugated double bond, and the number of the conjugated double bonds is an integer from 2 to 10.

Item 3. The liquid crystal composition according to item 1 or 2, wherein the additive component is at least one compound selected from the group of compounds represented by formula (1-1) to formula (1-6):

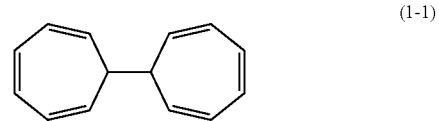

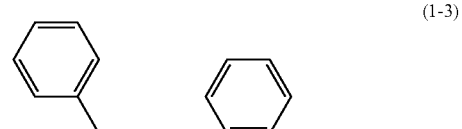

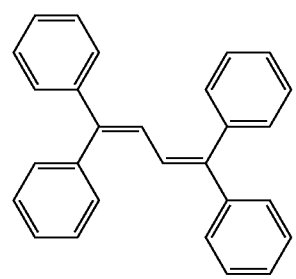

-continued

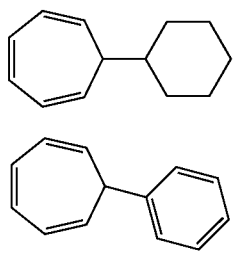
(1-5)

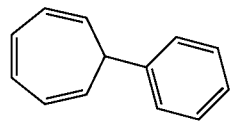
(1-6)

wherein, in formula (1-1) to formula (1-6), at least one piece of hydrogen on a ring may be replaced by fluorine, chlorine, alkyl having 1 to 12 carbons, alkoxy having 1 to 12 carbons, alkenyl having 2 to 12 carbons, or alkyl having 1 to 12 carbons in which at least one piece of hydrogen is replaced by fluorine or chlorine.

Item 4. The liquid crystal composition according to any one of items 1 to 3, wherein the additive component is at least one compound selected from the group of compounds represented by formula (1-1) to formula (1-6):

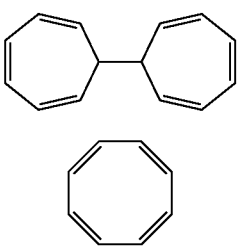
(1-1)

(1-2)

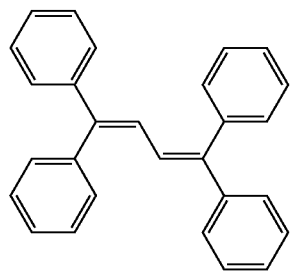
(1-3)

(1-4)

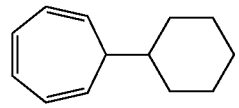
(1-5)

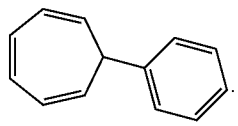
(1-6)

Item 5. The liquid crystal composition according to any one of items 1 to 4, wherein a proportion of the additive component is in the range of 0.005% by weight to 2% by weight based on the weight of the liquid crystal composition.

Item 6. The liquid crystal composition according to any one of items 1 to 5, containing at least one compound selected from the group of compounds represented by formula (2-1) to formula (2-35) as the first component:

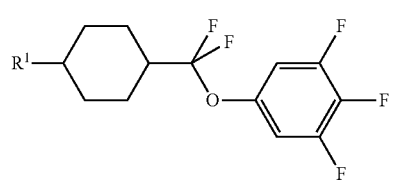
(2-1)

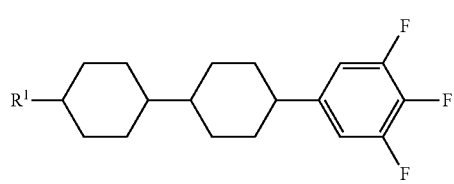
(2-2)

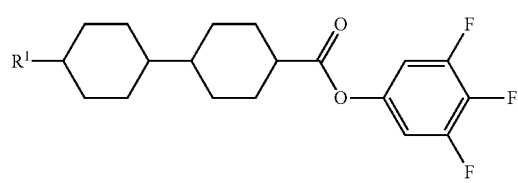
(2-3)

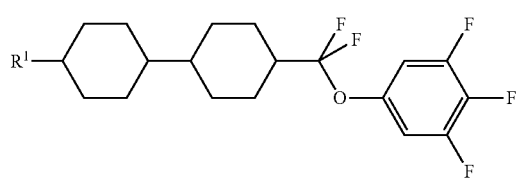
(2-4)

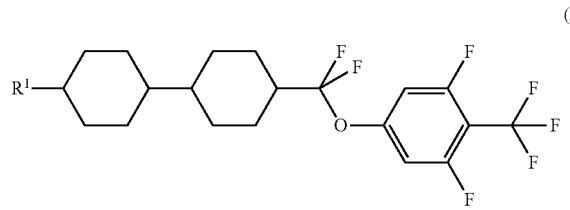
(2-5)

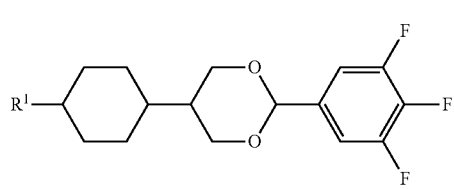
(2-6)

-continued
(2-7)
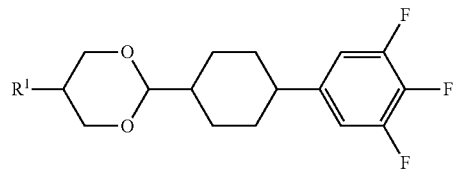
(2-8)
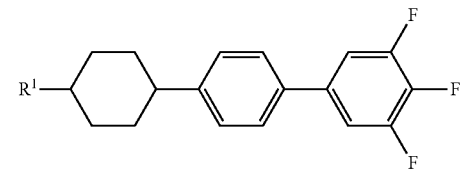
(2-9)
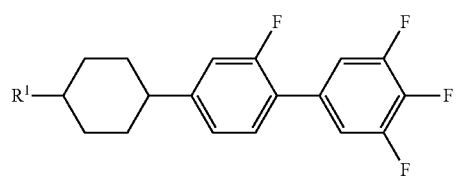
(2-10)
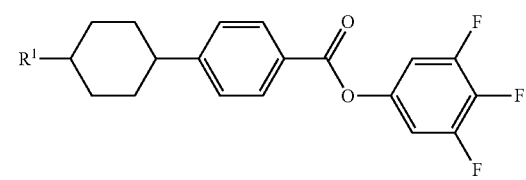
(2-11)
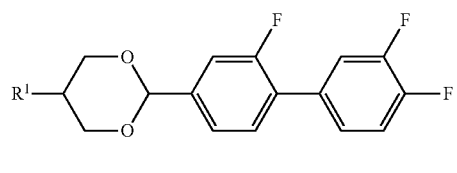
(2-12)
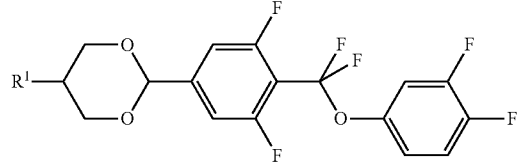
(2-13)
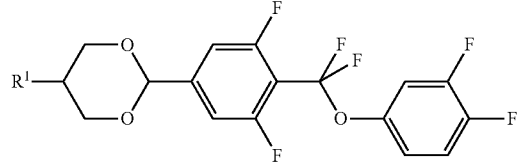
(2-14)
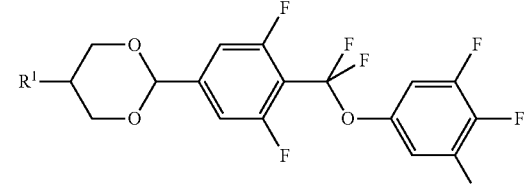
(2-15)
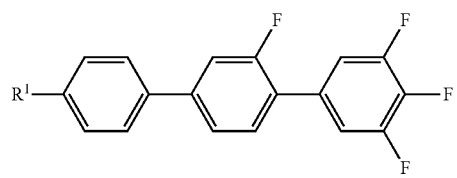
(2-16)
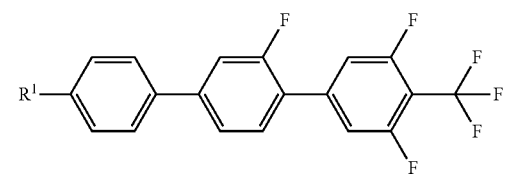
(2-17)
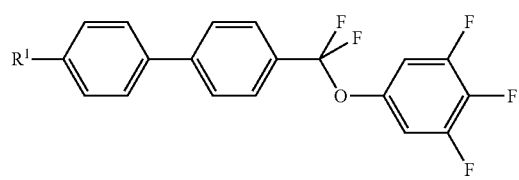
(2-18)
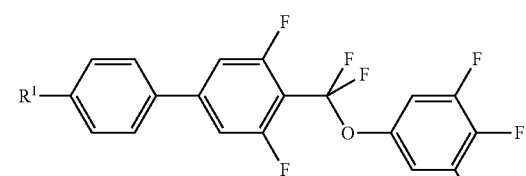
(2-19)
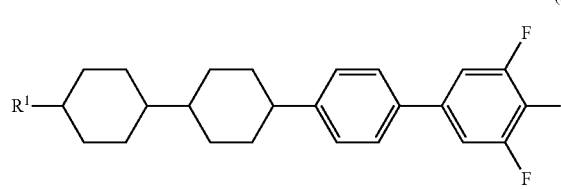
(2-20)
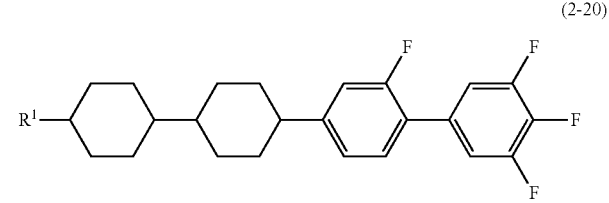
(2-21)
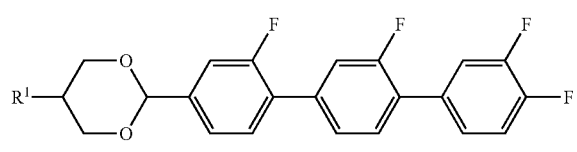
(2-22)
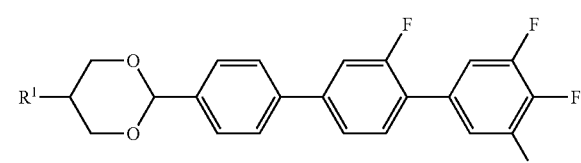

-continued
(2-23)
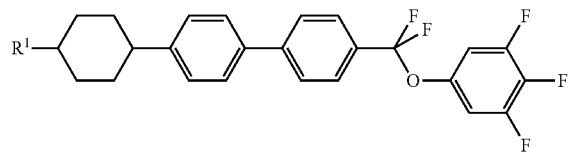
(2-24)
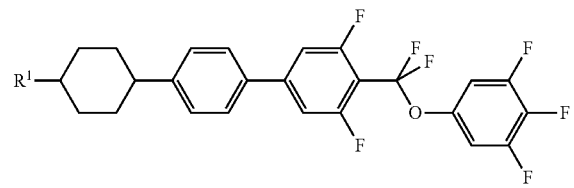
(2-25)
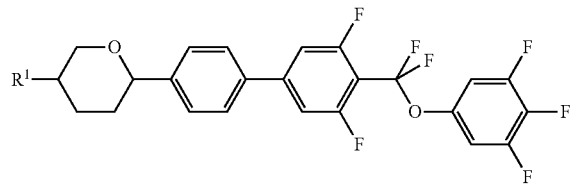
(2-26)
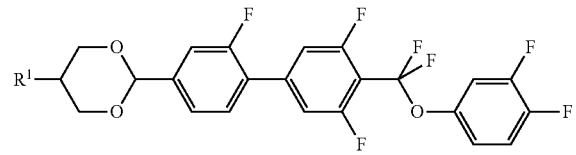
(2-27)
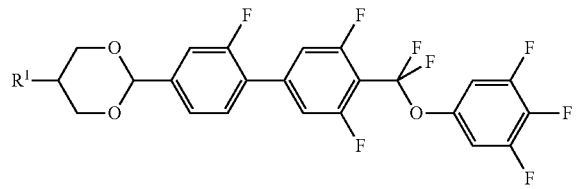
(2-28)
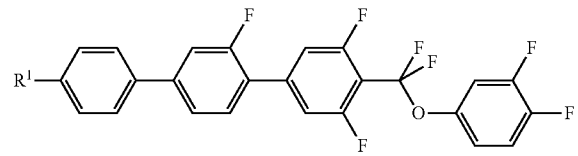
(2-29)
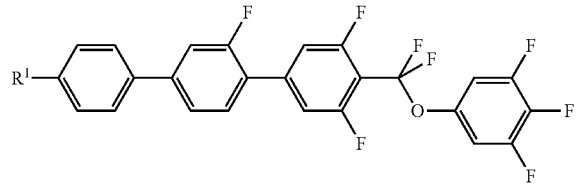
(2-30)
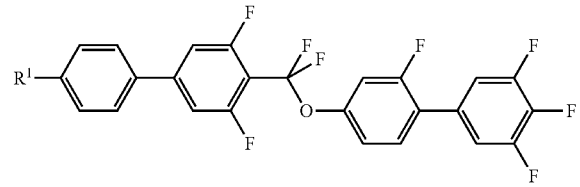
(2-31)
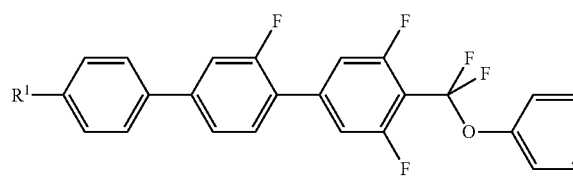
(2-32)
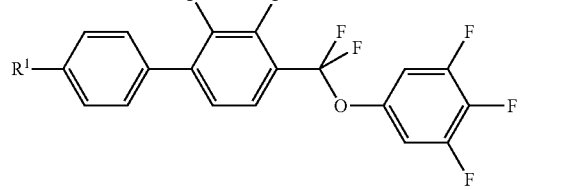
(2-33)
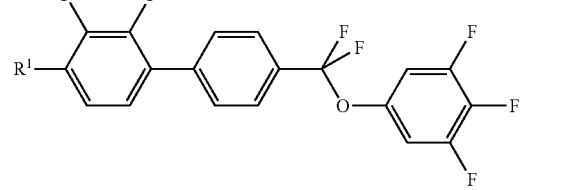
(2-34)
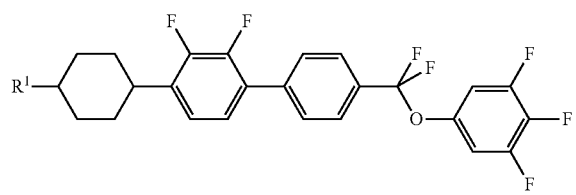
(2-35)
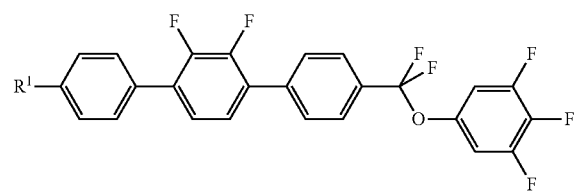

wherein, in formula (2-1) to formula (2-35), $R^1$ is alkyl having 1 to 12 carbons, alkoxy having 1 to 12 carbons or alkenyl having 2 to 12 carbons.

Item 7. The liquid crystal composition according to item 1 or 6, wherein a proportion of the first component is in the range of 10% by weight to 90% by weight based on the weight of the liquid crystal composition.

Item 8. The liquid crystal composition according to any one of items 1 to 7, containing at least one compound selected from the group of compounds represented by formula (3) as a second component:

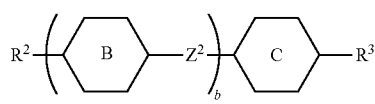

(3)

wherein, in formula (3), $R^2$ and $R^3$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; and b is 1, 2 or 3.

Item 9. The liquid crystal composition according to any one of items 1 to 8, containing at least one compound selected from the group of compounds represented by formula (3-1) to formula (3-13) as the second component:

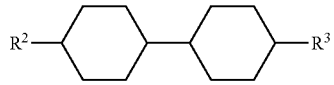

(3-1)

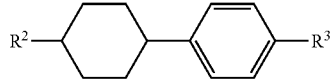

(3-2)

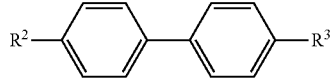

(3-3)

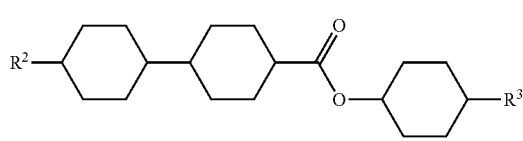

(3-4)

(3-5)

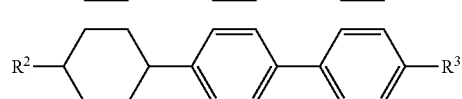

(3-6)

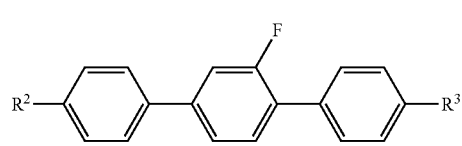

(3-7)

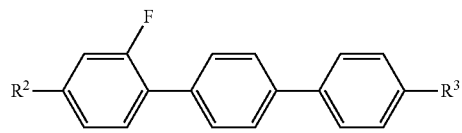

(3-8)

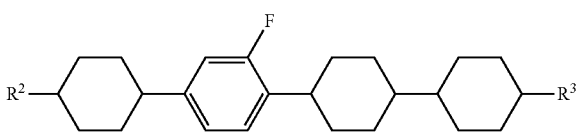

(3-9)

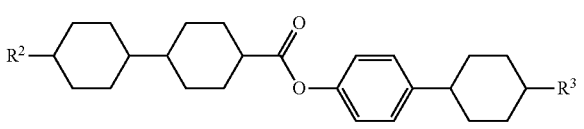

(3-10)

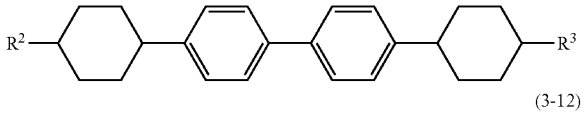

(3-11)

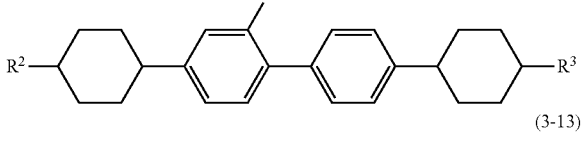

(3-12)

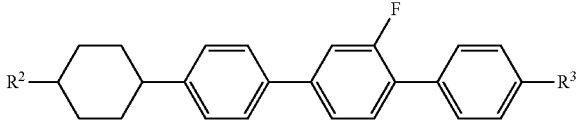

(3-13)

wherein, in formula (3-1) to formula (3-13), $R^2$ and $R^3$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine.

Item 10. The liquid crystal composition according to item 8 or 9, wherein a proportion of the second component is in the range of 10% by weight to 90% by weight based on the weight of the liquid crystal composition.

Item 11. The liquid crystal composition according to any one of items 1 to 10, containing at least one compound selected from the group of compounds represented by formula (4) as a third component:

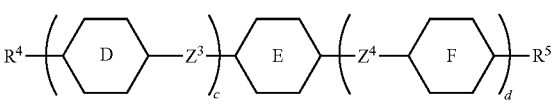

(4)

wherein, in formula (4), $R^4$ and $R^5$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; ring D and ring F are independently 1,4-cyclohexylene, 1,4-cyclohexylene, 1,4-phenylene, 1,4-phenylene in which at least one piece of hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

Item 12. The liquid crystal composition according to any one of items 1 to 11, containing at least one compound selected from the group of compounds represented by formula (4-1) to formula (4-21) as the third component:

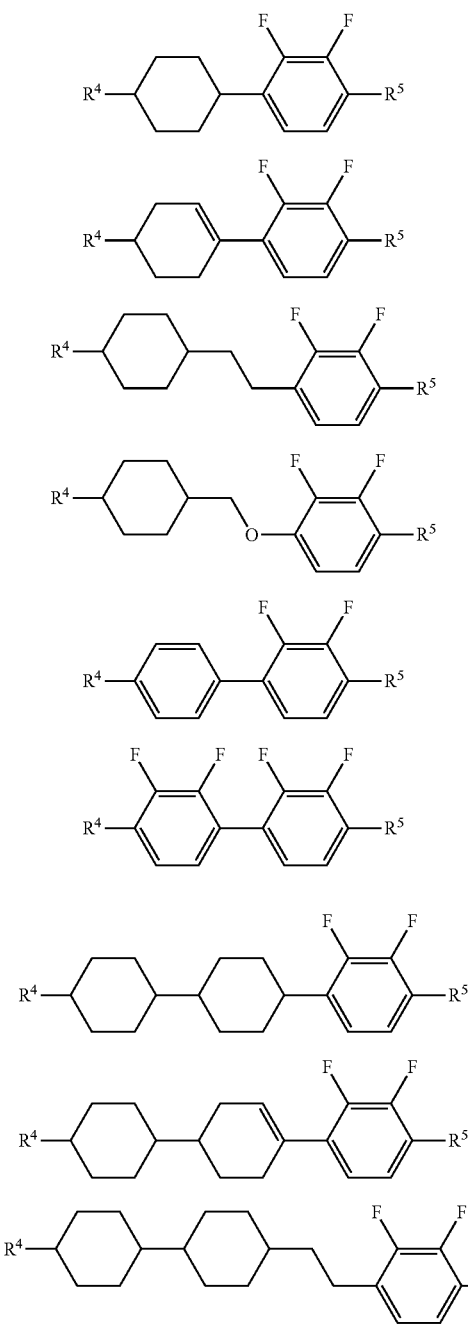

(4-1)

(4-2)

(4-3)

(4-4)

(4-5)

(4-6)

(4-7)

(4-8)

(4-9)

-continued

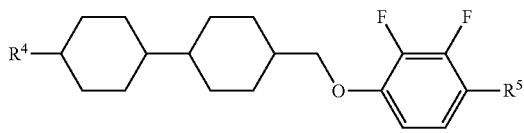

(4-10)

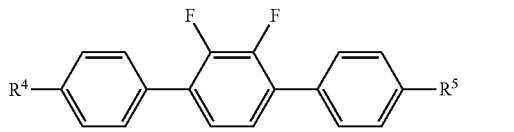

(4-11)

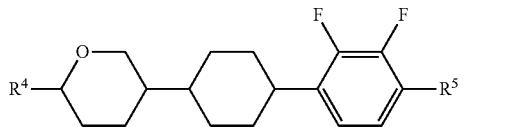

(4-12)

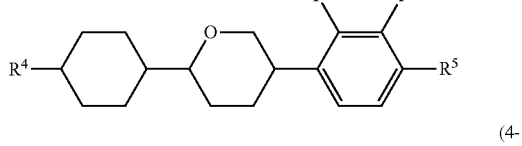

(4-13)

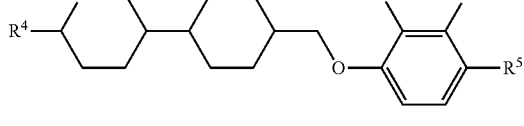

(4-14)

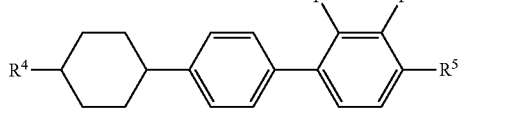

(4-15)

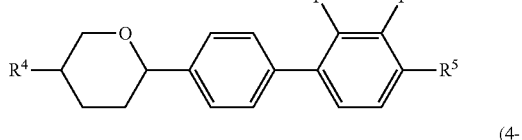

(4-16)

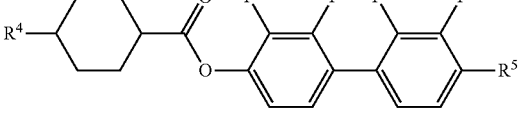

(4-17)

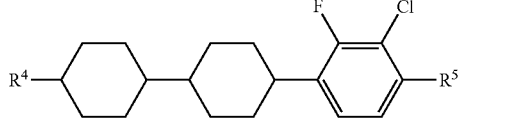

(4-18)

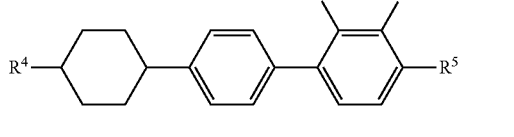

(4-19)

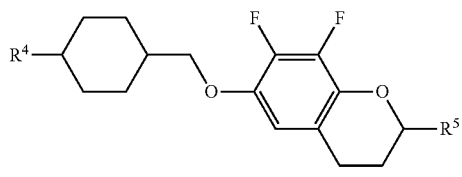
(4-20)

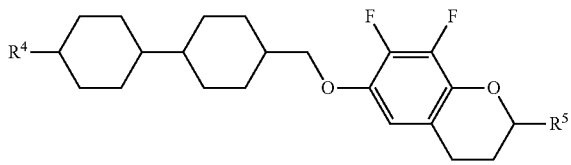
(4-21)

wherein, in formula (4-1) to formula (4-21), $R^4$ and $R^5$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine.

Item 13. The liquid crystal composition according to item 11 or 12, wherein a proportion of the third component is in the range of 3% by weight to 25% by weight based on the weight of the liquid crystal composition.

Item 14. The liquid crystal composition according to any one of items 1 to 13, wherein a maximum temperature of a nematic phase is 70° C. or more, an optical anisotropy (measured at 25° C.) at a wavelength of 589 nanometers is 0.07 or more, and a dielectric anisotropy (measured at 25° C.) at a frequency of 1 kHz is 2 or more.

Item 15. A liquid crystal display device, including the liquid crystal composition according to any one of items 1 to 14.

Item 16. The liquid crystal display device according to item 15, wherein an operating mode in the liquid crystal display device includes a TN mode, an ECB mode, an OCB mode, an IPS mode, an FFS mode or an FPA mode, and a driving mode in the liquid crystal display device includes an active matrix mode.

Item 17. Use of the liquid crystal composition according to any one of items 1 to 14 in a liquid crystal display device.

The invention further includes the following items: (a) the composition, containing one compound, two compounds, or three or more compounds selected from the group of additives such as an optically active compound, an antioxidant, an ultraviolet light absorber, a dye, an antifoaming agent, a polymerizable compound, a polymerization initiator and a polymerization inhibitor; (b) an AM device including the composition; (c) a polymer sustained alignment (PSA) mode AM device including the composition further containing the polymerizable compound; (d) the polymer sustained alignment (PSA) mode AM device, wherein the device includes the composition, and the polymerizable compound in the composition is polymerized; (e) a device including the composition and having the PC mode, the TN mode, the STN mode, the ECB mode, the OCB mode, the IPS mode, the VA mode, the FFS mode or the FPA mode; (f) a transmissive device including the composition; (g) use of the composition as the composition having the nematic phase; and (h) use as an optically active composition by adding the optically active compound to the composition.

The composition of the invention will be described in the following order. First, a constitution of the component compounds in the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compound will be described. Sixth, an additive that may be added to the composition will be described. Seventh, methods for synthesizing the component compounds will be described. Last, an application of the composition will be described.

First, the constitution of the component compounds in the composition will be described. The composition of the invention is classified into composition A and composition B. Composition A may further contain any other liquid crystal compound, an additive or the like in addition to a liquid crystal compound selected from compound (2), compound (3) and compound (4). "Any other liquid crystal compound" means a liquid crystal compound different from compound (2), compound (3) and compound (4). Such a compound is mixed with the composition for the purpose of further adjusting the characteristics. The additive includes the optically active compound, the antioxidant, the ultraviolet light absorber, the dye, the antifoaming agent, the polymerizable compound, the polymerization initiator and the polymerization inhibitor. A quencher is also classified into the additive.

Composition B consists essentially of liquid crystal compounds selected from compound (2), compound (3) and compound (4). An expression "essentially" means that the composition may contain the additive, but contains no any other liquid crystal compound. Specific examples of composition B include a composition containing compound (1), compound (2) and compound (3) as an essential component. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means "a value is zero" or "a value close to zero."

TABLE 2

| Characteristics of Compounds | | | |
|---|---|---|---|
| | Compounds | | |
| | Compound (2) | Compound (3) | Compound (4) |
| Maximum temperature | S to L | S to M | S to M |
| Viscosity | M to L | S to M | L |
| Optical anisotropy | S to L | S to L | M to L |
| Dielectric anisotropy | M to L [1)] | 0 | L [2)] |
| Specific resistance | L | L | L |

[1)] Compound having positive dielectric anisotropy
[2)] Compound having negative dielectric anisotropy Upon mixing the component compounds with the composition, the main effects of the component compounds on the characteristics of the composition are as described below. An additive component (quencher) contributes to high stability to heat or ultraviolet light. The amount of addition of the additive component is significantly small, and therefore the additive component has no influence on characteristics such as maximum temperature, optical anisotropy and dielectric anisotropy. The first component increases the dielectric anisotropy. The second component decreases the viscosity or increases the maximum temperature. The third component increases a dielectric constant in a minor axis direction.

The quencher is a substance that returns molecules from an excited state to a ground state. The molecules absorb light and excited. The molecules emit light when returning from the excited state to the ground state. The substance that receives energy from the excited molecules is referred to as "quencher." The quencher absorbs ultraviolet light, but capability thereof is smaller in comparison with the ultraviolet light absorber. A difference between the quencher and the ultraviolet light absorber is as described below. The ultraviolet light absorber is a compound that absorbs ultraviolet light preferentially to a substance to be protected from ultraviolet light, and transforms the light energy into thermal energy. In contrast, the quencher is a compound that receives the light energy absorbed by the substance to be protected, and transforms the light energy into thermal energy.

Specific examples of the quencher include a nonaromatic compound having a conjugated double bond. More specifically, the examples include conjugated polyene, and no aromatic compound. The number of the conjugated double bonds is preferably 2 to 15. The number is further preferably 2 to 10. The conjugated polyene is preferably in the form of a ring as in a seven-membered ring or an eight-membered ring. Specific examples of such a compound include compound (1-1), compound (1-2) and compound (1-4). The compounds may have a substituent such as cyclohexyl and phenyl. Specific examples of such a compound include compound (1-5) and compound (1-6). When the conjugated polyene has the substituent, the conjugated polyene may be a straight-chain shape. Specific examples of such a compound include compound (1-3) and 1,4-diphenyl-1,3-butadiene.

Third, the combination of components in the composition, the preferred proportion of the component compounds and the basis thereof will be described. A preferred combination of components in the composition includes a combination of the additive component and the first component, a combination of the additive component, the first component and the second component, a combination of the additive component, the first component and the third component, or a combination of the additive component, the first component, the second component and the third component. A further preferred combination includes the combination of the additive component, the first component and the second component, or the combination of the additive component, the first component, the second component and the third component.

A preferred proportion of the additive component is about 0.005% by weight or more for increasing the stability to ultraviolet light or heat, and about 2% by weight or less for decreasing the minimum temperature. A further preferred proportion is in the range of about 0.01% by weight to about 1% by weight. A particularly preferred proportion is in the range of about 0.03% by weight to about 0.3% by weight.

A preferred proportion of the first component is about 10% by weight or more for increasing the dielectric anisotropy, and about 90% by weight or less for decreasing the minimum temperature or decreasing the viscosity. A further preferred proportion is in the range of about 20% by weight to about 80% by weight. A particularly preferred proportion is in the range of about 30% by weight to about 70% by weight.

A preferred proportion of the second component is about 10% by weight or more for increasing the maximum temperature or decreasing the viscosity, and about 90% by weight or less for increasing the dielectric anisotropy. A further preferred proportion is in the range of about 20% by weight to about 80% by weight. A particularly preferred proportion is in the range of about 25% by weight to about 70% by weight.

A preferred proportion of the third component is about 3% by weight or more for increasing the dielectric anisotropy, and about 25% by weight or less for decreasing the minimum temperature. A further preferred proportion is in the range of about 5% by weight to about 20% by weight. A particularly preferred proportion is in the range of about 5% by weight to about 15% by weight.

Fourth, the preferred embodiment of the component compounds will be described. In formula (2), formula (3) and formula (4), $R^1$ is alkyl having 1 to 12 carbons, alkoxy having 1 to 12 carbons or alkenyl having 2 to 12 carbons. Preferred $R^1$ is alkyl having 1 to 12 carbons for increasing the stability to ultraviolet light or heat. $R^2$ and $R^3$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine. Preferred $R^2$ or $R^3$ is alkenyl having 2 to 12 carbons for decreasing the viscosity, and alkyl having to 12 carbons for increasing the stability. $R^4$ and $R^5$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine. Preferred $R^4$ or $R^5$ is alkyl having 1 to 12 carbons for increasing the stability, and alkoxy having 1 to 12 carbons for increasing the dielectric anisotropy.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Specific examples of preferred alkyl in which at least one piece of hydrogen is replaced by fluorine or chlorine include fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples include 2-fluoroethyl, 3-fluoropropyl, 4-fluorobutyl or 5-fluoropentyl for increasing the dielectric anisotropy.

Specific examples of preferred alkenyl in which at least one piece of hydrogen is replaced by fluorine or chlorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Preferred ring A is 1,4-phenylene or 2-fluoro-1,4-phenylene for increasing the optical anisotropy. With regard to the configuration of 1,4-cyclohexylene, trans is preferred to cis for increasing the maximum temperature. Tetrahydropyran-2,5-diyl includes:

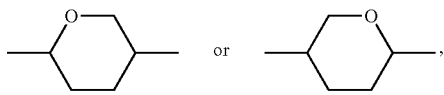

preferably

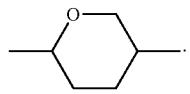

Ring B and ring C are independently 1,4-cyclohexylene, 1,4-phenylene, 2-fluoro-1,4-phenylene or 2,5-difluoro-1,4-phenylene. Preferred ring B or ring C is 1,4-cyclohexylene for decreasing the viscosity, or 1,4-phenylene for increasing the optical anisotropy. Ring D and ring F are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl. Preferred ring D or ring F is 1,4-cyclohexylene for decreasing the viscosity, tetrahydropyran-2,5-diyl for increasing the dielectric anisotropy, and 1,4-phenylene for increasing the optical anisotropy. Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring E is 2,3-difluoro-1,4-phenylene for increasing the dielectric anisotropy.

$Z^1$ is a single bond, ethylene, carbonyloxy or difluoromethyleneoxy. Preferred $Z^1$ is a single bond for decreasing the viscosity, and difluoromethyleneoxy for increasing the dielectric anisotropy. $Z^2$ is a single bond, ethylene or carbonyloxy. Preferred $Z^2$ is a single bond for decreasing the viscosity. $Z^3$ and $Z^4$ are independently a single bond, ethylene, carbonyloxy or methyleneoxy. Preferred $Z^3$ or $Z^4$ is a single bond for decreasing the viscosity, and methyleneoxy for increasing the dielectric anisotropy.

$X^1$ and $X^2$ are independently hydrogen or fluorine. Preferred $X^1$ or $X^2$ is fluorine for increasing the dielectric anisotropy.

$Y^1$ is fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine. Preferred $Y^1$ is fluorine for decreasing the minimum temperature.

Specific examples of preferred alkyl in which at least one piece of hydrogen is replaced by fluorine or chlorine include trifluoromethyl. Specific examples of preferred alkoxy in which at least one piece of hydrogen is replaced by fluorine or chlorine include trifluoromethoxy. Specific examples of preferred alkenyloxy in which at least one piece of hydrogen is replaced by fluorine or chlorine include trifluorovinyloxy.

Then, a is 1, 2, 3 or 4. Preferred a is 2 for decreasing the minimum temperature, and 3 for increasing the dielectric anisotropy. Then, b is 1, 2 or 3. Preferred b is 1 for decreasing the viscosity, and 2 or 3 for increasing the maximum temperature. Then, c is 1, 2 or 3, d is 0 or 1, and a sum of c and d is 3 or less. Preferred c is 1 for decreasing the viscosity, and 2 or 3 for increasing the maximum temperature. Preferred d is 0 for decreasing the viscosity, and 1 for decreasing the minimum temperature.

Fifth, the preferred component compound will be described. Preferred additive components include compound (1-1) to compound (1-6) described in item 2. Further preferred additive components include compound (1-1) or compound (1-2). In the compounds, at least one piece of hydrogen on a ring may be replaced by fluorine, chlorine, alkyl having 1 to 12 carbons, alkoxy having 1 to 12 carbons, alkenyl having 2 to 12 carbons, or alkyl having 1 to 12 carbons in which at least one piece of hydrogen is replaced by fluorine or chlorine. Specific examples of preferred substituents include fluorine, chlorine, methyl, ethyl, methoxy, fluoromethyl, difluoromethyl or trifluoromethyl. Further preferred examples include fluorine, chlorine, methyl or trifluoromethyl. A compound in which at least one piece of hydrogen on the ring is replaced by fluorine is particularly preferred. A compound that does not have such a substituent is preferred in view of easiness of synthesis.

Preferred compound (2) includes compound (2-1) to compound (2-35) described in item 4. In the compounds, at least one of the first components preferably includes compound (2-4), compound (2-12), compound (2-14), compound (2-15), compound (2-17), compound (2-18), compound (2-23), compound (2-27), compound (2-29) or compound (2-30). At least two of the first components preferably includes a combination of compound (2-12) and compound (2-15), a combination of compound (2-14) and compound (2-27), a combination of compound (2-18) and compound (2-24), a combination of compound (2-18) and compound (2-29), a combination of compound (2-24) and compound (2-29), or a combination of compound (2-29) and compound (2-30).

Preferred compound (3) includes compound (3-1) to compound (3-13) described in item 7. In the compounds, at least one of the second components preferably includes compound (3-1), compound (3-3), compound (3-5), compound (3-6), compound (3-7) or compound (3-13). At least two of the second components preferably includes a combination of compound (3-1) and compound (3-3), a combination of compound (3-1) and compound (3-5), or a combination of compound (3-1) and compound (3-7).

Preferred compound (4) includes compound (4-1) to compound (4-21) described in item 10. In the compounds, at least one of the third components preferably includes compound (4-1), compound (4-4), compound (4-5), compound (4-7), compound (4-10) or compound (4-15). At least two of the third components preferably includes a combination of compound (4-1) and compound (4-7), a combination of compound (4-1) and compound (4-15), a combination of compound (4-4) and compound (4-7), a combination of compound (4-4) and compound (4-15), a combination of compound (4-5) and compound (4-7), or a combination of compound (4-5) and compound (4-10).

Sixth, the additive that may be added to the composition will be described. Such an additive includes the optically active compound, the antioxidant, the ultraviolet light absorber, the dye, the antifoaming agent, the polymerizable compound, the polymerization initiator and the polymerization inhibitor. The optically active compound is added to the composition for the purpose of inducing a helical structure in liquid crystal molecules to give a twist angle. Examples of such a compound include compound (5-1) to compound (5-5). A preferred proportion of the optically active compound is about 5% by weight or less. A further preferred proportion is in the range of about 0.01% by weight to about 2% by weight.

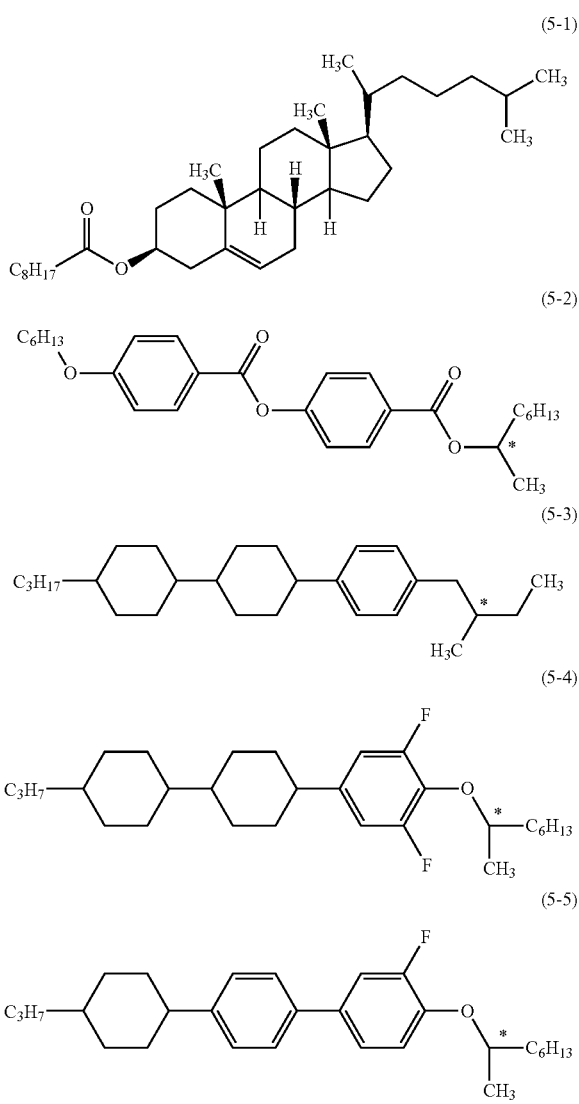

The antioxidant is added to the composition for preventing a decrease in the specific resistance caused by heating in air, or for maintaining a large voltage holding ratio at room temperature and also at a temperature close to the maximum temperature even after the device has been used for a long period of time. Specific examples of a preferred antioxidant include compound (6) in which n is an integer from 1 to 9.

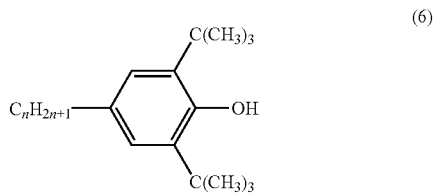

In compound (6), preferred n is 1, 3, 5, 7 or 9. Further preferred n is 7. Compound (6) in which n is 7 is effective in maintaining the large voltage holding ratio at room temperature and also at a temperature close to the maximum temperature even after the device has been used for a long period of time because such compound (6) has small volatility. A preferred proportion of the antioxidant is about 50 ppm or more for achieving an effect thereof, and about 600 ppm or less for avoiding a decrease in the maximum temperature or avoiding an increase in the minimum temperature. A further preferred proportion is in the range of about 100 ppm to about 300 ppm.

Compound (1-1) to compound (1-6) are useful as the quencher. The ultraviolet light absorber may be added to the composition together with the quencher. Specific examples of such a preferred ultraviolet light absorber include a benzophenone derivative, a benzoate derivative and a triazole derivative. A light stabilizer such as an amine having steric hindrance is also preferred.

A dichroic dye such as an azo dye or an anthraquinone dye is added to the composition to be adapted for a device having a guest host (GH) mode. A preferred proportion of the dye is in the range of about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing a poor display. A further preferred proportion is in the range of about 1 ppm to about 500 ppm.

The polymerizable compound is added to the composition to be adapted for a polymer sustained alignment (PSA) mode device. Specific examples of a preferred polymerizable compound include a compound having a polymerizable group such as acrylate, methacrylate, a vinyl compound, a vinyloxy compound, propenyl ether, an epoxy compound (oxirane, oxetane) and vinyl ketone. Further preferred examples include an acrylate derivative or a methacrylate derivative. A preferred proportion of the polymerizable compound is about 0.05% by weight or more for achieving an effect thereof, and about 10% by weight or less for preventing a poor display. A further preferred proportion is in the range of about 0.1% by weight to about 2% by weight. The polymerizable compound is polymerized by irradiation with ultraviolet light. The polymerizable compound may be polymerized in the presence of an initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of about 0.1% by weight to about 5% by weight based on the weight of the polymerizable compound. A further preferred proportion is in the range of about 1% by weight to about 3% by weight based thereon.

The polymerizable compound such as compound (4) is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of about 0.1% by weight to about 5% by weight based on the total weight of the polymerizable compound. A further preferred proportion is in the range of about 1% by weight to about 3% by weight based thereon.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

Seventh, the methods for synthesizing the component compounds will be described. The compounds can be prepared according to known methods. Examples of the synthetic methods are described. Compound (1-2) is commercially available. Compound (2-2) and compound (2-8) are prepared according to a method described in JP H2-233626 A. Compound (3-1) is prepared according to a method described in JP S59-176221 A. Compound (4-1) and compound (4-7) are prepared according to a method described in JP H2-503441 A. The antioxidant is commercially available. A compound in which n in formula (6) is 1 is available from Sigma-Aldrich Corporation. Compound (6) in which n is 7 or the like is prepared according to a method described in U.S. Pat. No. 3,660,505 B.

Any compounds whose synthetic methods are not described above can be prepared according to methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. The composition mainly has the minimum temperature of about −10° C. or lower, the maximum temperature of about 70° C. or higher, and the optical anisotropy in the range of about 0.07 to about 0.20. The composition having optical anisotropy in the range of about 0.08 to about 0.25 may be prepared by controlling the proportion of the component compounds or by mixing any other liquid crystal compound. The composition having optical anisotropy in the range of about 0.10 to about 0.30 may be prepared by trial and error. A device including the composition has the large voltage holding ratio. The composition is suitable for use in the AM device. The composition is particularly suitable for use in a transmissive AM device. The composition can be used as the composition having the nematic phase, and as the optically active composition by adding the optically active compound.

The composition can be used in the AM device. The composition can also be used in a PM device. The composition can also be used in the AM device and the PM device each having a mode such as the PC mode, the TN mode, the STN mode, the ECB mode, the OCB mode, the IPS mode, the FFS mode, the VA mode and the FPA mode. Use in the AM device having the TN mode, the OCB mode, the IPS mode or the FFS mode is particularly preferred. In the AM device having the IPS mode or the FFS mode, alignment of liquid crystal molecules when no voltage is applied may be parallel or vertical to a glass substrate. The devices may be of a reflective type, a transmissive type or a transflective type. Use in the transmissive device is preferred. The composition can also be used in an amorphous silicon-TFT device or a polycrystal silicon-TFT device. The composition can also be used in a nematic curvilinear aligned phase (NCAP) device prepared by microencapsulating the composition and a polymer dispersed (PD) device in which a three-dimensional network-polymer is formed in the composition.

EXAMPLES

The invention will be described in greater detail by way of Examples. However, the invention is not limited by the Examples. The invention includes a mixture of a composition in Example 1 and a composition in Example 2. The invention also includes a mixture in which at least two compositions in Examples were mixed. The thus prepared compound was identified by methods such as an NMR analysis. Characteristics of the compound, the composition and the device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase, nonpolar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by the method as described below. The mixture of liquid crystal compounds is analyzed by gas chromatograph (FID). An area ratio of each peak in the gas chromatogram corresponds to the ratio of the liquid crystal compounds. When the capillary columns described above were used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of a composition or a device were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85× (measured value of a base liquid crystal)}/0.15. When a smectic phase (or crystals) precipitates at the ratio thereof at 25° C., a ratio of the compound to the base liquid crystal was changed step by step in the order of (10% by weight:90% by weight), (5% by weight:95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

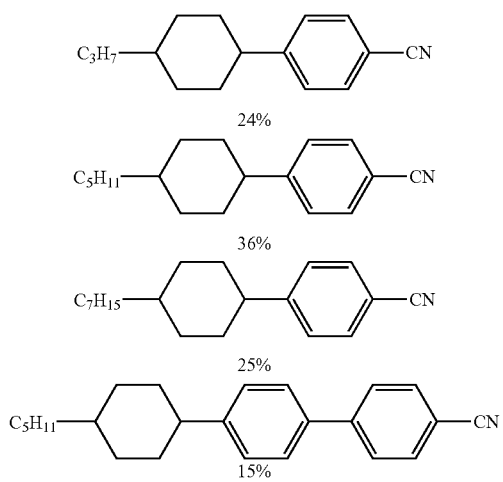

Measuring method: Characteristics were measured according to the methods described below. Most of the measuring methods are applied as described in the Standard of Japan Electronics and Information Technology Industries Association (hereinafter abbreviated as JEITA) (JEITA ED-2521B) discussed and established by JEITA, or modified thereon. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of nematic phase ($T_C$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_C$ was expressed as $T_C$<−20° C. A minimum temperature of the nematic phase may be occasionally abbreviated as "minimum temperature."

(3) Viscosity (bulk viscosity; η; measured at 20° C.; mPa·s): For measurement, a cone-plate (E type) rotational viscometer made by Tokyo Keiki, Inc. was used.

(4) Viscosity (rotational viscosity; γ1; measured at 25° C.; mPa·s): Measurement was carried out according to a method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was applied stepwise to the device in the range of 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. A value of dielectric anisotropy required for the calculation was determined using the device by which the rotational viscosity was measured and by a method described below.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (Δε; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (ε∥) of liquid crystal molecules in a major axis direction was measured. Sine waves (0.5 V, 1 kHz) were applied to the device, and after 2 seconds, a dielectric constant (ε⊥) of liquid crystal molecules in a minor axis direction was measured. A value of dielectric anisotropy was calculated from an equation: Δε=ε∥−ε⊥.

(7) Threshold voltage (Vth; measured at 25° C.; V): For measurement, an LCD-5100 luminance meter made by Otsuka Electronics Co., Ltd. was used. A light source was a halogen lamp. A sample was put in a normally white mode TN device in which a distance (cell gap) between two glass substrates was 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of a voltage at 90% transmittance.

(8) Voltage holding ratio (VHR-9; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 1 V) was applied to the TN device and the device was charged. A decaying voltage was measured for 166.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-10; measured at 60° C.; %): A voltage holding ratio was measured according to procedures identical with the procedures described above except that measurement was carried out at 60° C. in place of 25° C. The thus obtained value was expressed in terms of VHR-10.

(10) Voltage holding ratio (VHR-11; measured at 60° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with ultraviolet light of 5 mW/cm$^2$ for 167 minutes. A light source was a black light made by EYE GRAPHICS CO., LTD., F40T10/BL (peak wavelength of 369 nm), and a distance between the device and the light source was 5 millimeters. In measurement of VHR-11, a decaying voltage was measured for 166.7 milliseconds. A composition having large VHR-11 has large stability to ultraviolet light.

(11) Voltage holding ratio (VHR-12; measured at 60° C.; %): Stability to heat was evaluated by measuring a voltage holding ratio after a TN device into which a sample was injected was heated in a constant-temperature bath at 120° C. for 20 hours. In measurement of VHR-12, a decaying voltage was measured for 166.7 milliseconds. A composition having large VHR-12 has large stability to heat.

(12) Response time (τ; measured at 25° C.; ms): For measurement, an LCD-5100 luminance meter made by Otsuka Electronics Co., Ltd. was used. A light source was a halogen lamp. A low-pass filter was set to 5 kHz. A sample was put in a normally white mode TN device in which a distance (cell gap) between two glass substrates was 5.0 micrometers and a twist angle was 80 degrees. A voltage (rectangular waves; 60 Hz, 5 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A rise time (τr; millisecond) was expressed in terms of time required for a change from 90% transmittance to 10% transmittance. A fall time (τf; millisecond) was expressed in terms of time required for a change from 10% transmittance to 90% transmittance. A response time was expressed by a sum of the rise time and the fall time thus obtained.

(13) Elastic constant (K; measured at 25° C.; pN): For measurement, HP4284A LCR Meter made by Yokogawa-Hewlett-Packard Co. was used. A sample was put in a horizontal alignment device in which a distance (cell gap) between two glass substrates was 20 micrometers. An electric charge of 0 V to 20 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku in Japanese; Nikkan Kogyo Shimbun, Ltd.), and values of K11 and K33 were obtained from equation (2.99). Next, K22 was calculated using the previously determined values of K11 and K33 in equation (3.18) on page 171. Elastic constant K was expressed in terms of a mean value of the thus determined K11, K22 and K33.

(14) Specific resistance (ρ; measured at 25° C.; Ω cm): Into a vessel equipped with electrodes, 1.0 milliliter of sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(15) Helical pitch (P; measured at room temperature; μm): A helical pitch was measured according to a wedge method. Refer to page 196 in "Handbook of Liquid Crystals (Ekisho Binran in Japanese)" (issued in 2000, Maruzen Co., Ltd.). A sample was injected into a wedge cell and left to stand at room temperature for 2 hours, and then a gap (d2−d1) between disclination lines was observed by a polarizing microscope (trade name: MM40/60 Series, Nikon Corporation). A helical pitch (P) was calculated according to the following equation in which an angle of the wedge cell was expressed as θ: P=2×(d2−d1)×tan θ.

(16) Dielectric constant (ε⊥; measured at 25° C.) in minor axis direction: A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (ε⊥) of liquid crystal molecules in a minor axis direction was measured.

The compounds in Examples were represented using symbols according to definitions in Table 3 described below. In Table 3, the configuration of 1,4-cyclohexylene is trans. A parenthesized number next to a symbolized compound corresponds to the number of the compound. A symbol (—) means any other liquid crystal compound. A proportion (percentage) of the liquid crystal compound is expressed in terms of weight percent (% by weight) based on the weight of the liquid crystal composition. Values of the characteristics of the composition were summarized in the last part.

TABLE 3

Method for Description of Compounds using Symbols
R—(A₁)Z₁—...—Zₙ—(Aₙ)—R'

1) Left-terminal Group R—   Symbol $C_nH_{2n+1}$—   n—
$C_nH_{2n+1}O$—   nO—
$C_mH_{2m+1}OC_nH_{2n}$—   mOn—
$CH_2=CH$—   V—
$C_nH_{2n+1}$—CH=CH—   nV—
$CH_2=CH$—$C_nH_{2n}$—   Vn—
$C_mH_{2m+1}$—CH=CH—$C_nH_{2n}$—   mVn—
$CF_2=CH$—   VFF—
$CF_2=CH$—$C_nH_{2n}$—   VFFn—
F—$C_nH_{2n}$—   Fn—

2) Right-terminal Group —R'   Symbol

—$C_nH_{2n+1}$   —n
—$OC_nH_{2n+1}$   —On
—CH=$CH_2$   —V
—CH=CH—$C_nH_{2n+1}$   —Vn
—$C_nH_{2n}$—CH=$CH_2$   —nV
—$C_nH_{2n}$—CH=CH—$C_mH_{2m+1}$   —nVm
—CH=$CF_2$   —VFF
—$COOCH_3$   —EMe
—F   —F
—Cl   —CL
—$OCF_3$   —OCF3
—$CF_3$   —CF3
—CN   —C 3) bonding Group —$Z_n$—   Symbol

—$C_2H_4$—   2
—COO—   E
—CH=CH—   V
—C≡C—   T
—$CF_2O$—   X
—$CH_2O$—   1O

4) Ring —$A_n$—   Symbol

   H

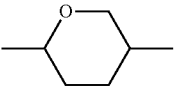   Dh

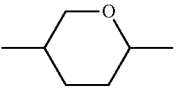   dh

   B

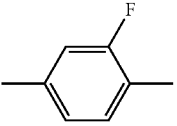   B(F)

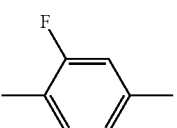   B(2F)

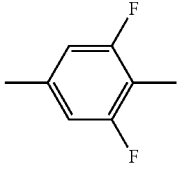   B(F,F)

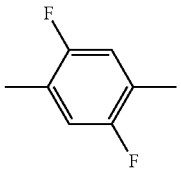   B(2F,5F)

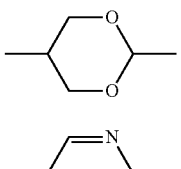   G

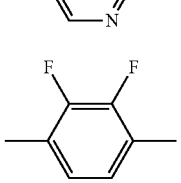   Py

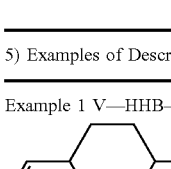   B(2F,3F)

5) Examples of Description

Example 1 V—HHB—1

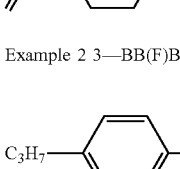

Example 2 3—BB(F)B(F,F)—F

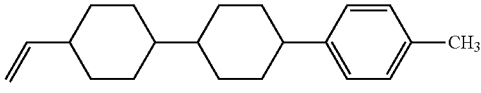

Example 3 4—BB(F)(F,F)XB(F,F)—F

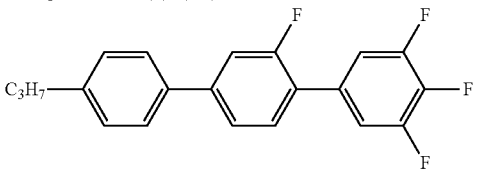

Example 4 5—GB(F,F)XB(F,F)—F

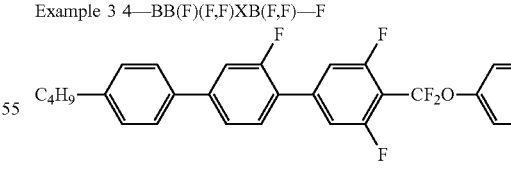

Example 1

| | | |
|---|---|---|
| 3-HHXB(F,F)—F | (2-4) | 10% |
| 3-HHXB(F,F)—CF3 | (2-5) | 3% |
| 2-HHBB(F,F)—F | (2-19) | 4% |
| 3-HHBB(F,F)—F | (2-19) | 5% |
| 4-HHBB(F,F)—F | (2-19) | 4% |
| 5-HHBB(F,F)—F | (2-19) | 4% |
| 4-GB(F)B(F,F)XB(F,F)—F | (2-27) | 7% |
| 3-BB(F)B(F,F)XB(F)—F | (2-28) | 4% |
| 3-BB(F)B(F,F)XB(F,F)—F | (2-29) | 3% |
| 4-BB(F)B(F,F)XB(F,F)—F | (2-29) | 8% |
| 5-BB(F)B(F,F)XB(F,F)—F | (2-29) | 6% |
| 3-HH—V | (3-1) | 30% |
| 4-HH—V1 | (3-1) | 5% |
| 7-HB-1 | (3-2) | 3% |
| 3-HHB—O1 | (3-5) | 4% |

The above composition having positive dielectric anisotropy was prepared, and characteristics thereof were measured. NI=107.1° C.; Tc <−20° C.; Δn=0.113; Δε=11.2; Vth=1.45 V; η=16.8 mPa·s; VHR-11=44.6%.

Compound (1-1) was added to the composition in a proportion of 0.05% by weight, and VHR-11 was measured. VHR-11=73.8%.

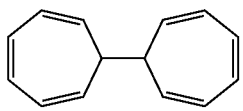

(1-1)

Example 2

| | | |
|---|---|---|
| 4-GHB(F,F)—F | (2-7) | 5% |
| 3-GB(F)B(F)—F | (2-11) | 5% |
| 3-GB(F,F)XB(F)—F | (2-13) | 4% |
| 2-HHBB(F,F)—F | (2-19) | 4% |
| 3-HHBB(F,F)—F | (2-19) | 6% |
| 4-HHBB(F,F)—F | (2-19) | 5% |
| 4-GB(F)B(F,F)XB(F,F)—F | (2-27) | 7% |
| 4-BB(F)B(F,F)XB(F,F)—F | (2-29) | 9% |
| 5-BB(F)B(F,F)XB(F,F)—F | (2-29) | 7% |
| 3-HHB—CL | (2) | 3% |
| 3-HH—V | (3-1) | 29% |
| 3-HH—VFF | (3-1) | 4% |
| 3-HB—O2 | (3-2) | 3% |
| 3-HHB-3 | (3-5) | 3% |
| 5-HBB-2 | (3-6) | 3% |
| 3-HBBH—1O1 | (—) | 3% |

The above composition having positive dielectric anisotropy was prepared, and characteristics thereof were measured. NI=104.1° C.; Tc <−20° C.; Δn=0.114; Δε=10.9; Vth=1.55 V; η=16.9 mPa·s; VHR-11=49.3%.

Compound (1-1) was added to the composition in a proportion of 0.1% by weight, and VHR-11 was measured. VHR-11=74.5%.

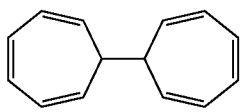

(1-1)

Example 3

| | | |
|---|---|---|
| 3-HHXB(F,F)—F | (2-4) | 11% |
| 3-HGB(F,F)—F | (2-6) | 3% |
| 4-GHB(F,F)—F | (2-7) | 10% |
| 3-BB(F,F)XB(F,F)—F | (2-18) | 9% |
| 2-HHBB(F,F)—F | (2-19) | 4% |
| 3-HHBB(F,F)—F | (2-19) | 5% |
| 4-BB(F)B(F,F)XB(F,F)—F | (2-29) | 9% |
| 5-BB(F)B(F,F)XB(F,F)—F | (2-29) | 3% |
| 3-HB(2F,3F)BXB(F,F)—F | (2-34) | 10% |
| 3-HH—V | (3-1) | 20% |
| 1-BB-5 | (3-3) | 5% |
| 3-HHB-1 | (3-5) | 8% |
| 3-HBB-2 | (3-6) | 3% |

The above composition having positive dielectric anisotropy was prepared, and characteristics thereof were measured. NI=94.9° C.; Tc <−20° C.; Δn=0.113; Δε=12.1; Vth=1.44 V; η=18.1 mPa·s; VHR-11=52.7%.

Compound (1-2) was added to the composition in a proportion of 0.1% by weight, and VHR-11 was measured. VHR-11=78.5%.

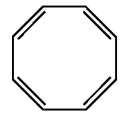

(1-2)

Example 4

| | | |
|---|---|---|
| 3-HHB(F,F)—F | (2-2) | 3% |
| 3-HHXB(F,F)—F | (2-4) | 13% |
| 3-HB(F)B(F,F)—F | (2-9) | 5% |
| 3-BB(F)B(F,F)—F | (2-15) | 13% |
| 3-HHBB(F,F)—F | (2-19) | 3% |
| 4-GBB(F)B(F,F)—F | (2-22) | 3% |
| 3-HBBXB(F,F)—F | (2-23) | 8% |
| 3-HBB(F,F)XB(F,F)—F | (2-24) | 6% |
| 3-BB(2F,3F)BXB(F,F)—F | (2-35) | 3% |
| 3-HH—V | (3-1) | 24% |
| 3-HH—V1 | (3-1) | 7% |
| V2—BB-1 | (3-3) | 3% |
| 3-HHEH-3 | (3-4) | 3% |
| 1-BB(F)B—2V | (3-7) | 3% |
| 5-HBB(F)B-2 | (3-13) | 3% |

The above composition having positive dielectric anisotropy was prepared, and characteristics thereof were measured. NI=93.7° C.; Tc <−20° C.; Δn=0.121; Δε=7.5; Vth=1.59 V; η=18.5 mPa·s.

Compound (1-3) was added to the composition in a proportion of 0.1% by weight, and VHR-11 was measured. VHR-11=81.0%.

(1-3)

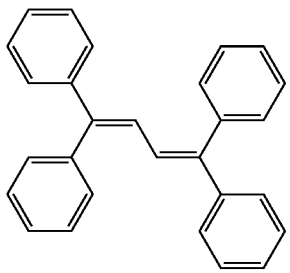

Example 5

| | | |
|---|---|---|
| 5-HXB(F,F)—F | (2-1) | 5% |
| 3-HHB(F,F)—F | (2-2) | 10% |
| 3-HHEB(F,F)—F | (2-3) | 9% |
| 3-HHXB(F,F)—F | (2-4) | 13% |
| 2-HBEB(F,F)—F | (2-10) | 3% |
| 3-HBEB(F,F)—F | (2-10) | 3% |
| 3-BBXB(F,F)—F | (2-17) | 3% |
| 3-BB(F,F)XB(F,F)—F | (2-18) | 7% |
| 3-dhBB(F,F)XB(F,F)—F | (2-25) | 4% |
| 3-BB(F)B(F,F)XB(F)B(F,F)—F | (2-31) | 3% |
| 3-HB—CL | (2) | 6% |
| 3-HH—V | (3-1) | 7% |
| 3-HH—V1 | (3-1) | 10% |
| 5-HH—V | (3-1) | 7% |
| 3-HHEBH-3 | (3-10) | 4% |
| 3-BB(2F,3F)—O2 | (4-5) | 3% |
| 3-dhBB(2F,3F)—O2 | (4-16) | 3% |

The above composition having positive dielectric anisotropy was prepared, and characteristics thereof were measured. NI=93.7° C.; Tc <−20° C.; Δn=0.121; Δε=7.5; Vth=1.59 V; η=18.5 mPa·s.

Compound (1-1) was added to the composition in a proportion of 0.2% by weight, and VHR-11 was measured. VHR-11=85.7%.

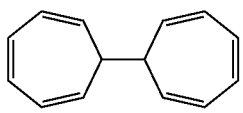
(1-1)

Example 6

| | | |
|---|---|---|
| 3-GB(F,F)XB(F,F)—F | (2-14) | 4% |
| 3-BB(F)B(F,F)—CF3 | (2-16) | 3% |
| 3-BB(F,F)XB(F,F)—F | (2-18) | 16% |
| 3-HHB(F)B(F,F)—F | (2-20) | 4% |
| 3-HBBXB(F,F)—F | (2-23) | 10% |
| 5-GB(F)B(F,F)XB(F)—F | (2-26) | 4% |
| 4-GB(F)B(F,F)XB(F,F)—F | (2-27) | 4% |
| 5-GB(F)B(F,F)XB(F,F)—F | (2-27) | 4% |
| 3-B(2F,3F)BXB(F,F)—F | (2-33) | 3% |
| 3-HH—V | (3-1) | 25% |
| 3-HH—O1 | (3-1) | 3% |
| 1-BB-3 | (3-3) | 3% |
| V—HHB-1 | (3-5) | 5% |
| V—HBB-2 | (3-6) | 6% |
| V—HHB(2F,3F)—O2 | (4-7) | 3% |
| 3-HBB(2F,3F)—O2 | (4-15) | 3% |

The above composition having positive dielectric anisotropy was prepared, and characteristics thereof were measured. NI=73.2° C.; Tc <−20° C.; Δn=0.115; Δε=11.7; Vth=1.26 V; η=17.3 mPa·s.

Compound (1-4) was added to the composition in a proportion of 0.03% by weight, and VHR-11 was measured. VHR-11=82.2%.

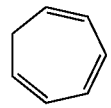
(1-4)

Example 7

| | | |
|---|---|---|
| 3-HBB(F,F)—F | (2-8) | 4% |
| 3-GB(F)B(F,F)—F | (2-12) | 3% |
| 3-BB(F)B(F,F)—F | (2-15) | 6% |
| 3-BB(F,F)XB(F,F)—F | (2-18) | 18% |
| 3-GB(F)B(F)B(F)—F | (2-21) | 7% |
| 3-HBBXB(F,F)—F | (2-23) | 3% |
| 3-GB(F)B(F,F)XB(F,F)—F | (2-27) | 3% |
| 4-BB(F,F)XB(F)B(F,F)—F | (2-30) | 3% |
| 3-HH—V | (3-1) | 29% |
| 1-BB-3 | (3-3) | 4% |
| V—HHB-1 | (3-5) | 11% |
| 3-HB(F)HH-5 | (3-9) | 3% |
| 5-HBBH-3 | (3-11) | 3% |
| 3-HB(F)BH-3 | (3-12) | 3% |

The above composition having positive dielectric anisotropy was prepared, and characteristics thereof were measured. NI=79.8° C.; Tc <−20° C.; Δn=0.118; Δε=9.4; Vth=1.60 V; η=21.0 mPa·s.

Compound (1-1) was added to the composition in a proportion of 0.05% by weight, and VHR-11 was measured. VHR-11=90.1%.

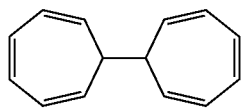
(1-1)

Example 8

| | | |
|---|---|---|
| 3-HHXB(F,F)—F | (2-4) | 10% |
| 4-GHB(F,F)—F | (2-7) | 10% |
| 3-BB(F,F)XB(F,F)—F | (2-18) | 6% |
| 2-HHBB(F,F)—F | (2-19) | 4% |
| 3-HHBB(F,F)—F | (2-19) | 6% |
| 4-HHBB(F,F)—F | (2-19) | 5% |
| 5-HHBB(F,F)—F | (2-19) | 5% |
| 3-GBB(F)B(F,F)—F | (2-22) | 3% |
| 4-GB(F)B(F,F)XB(F)—F | (2-26) | 8% |

| | | |
|---|---|---|
| 4-BB(F)B(F,F)XB(F,F)—F | (2-29) | 3% |
| 3-HH—V | (3-1) | 19% |
| 2-HH-3 | (3-1) | 4% |
| 3-HH-4 | (3-1) | 3% |
| V2—BB—1 | (3-3) | 6% |
| 3-HHB-1 | (3-5) | 5% |
| 5-HBB(F)B-3 | (3-13) | 3% |

The above composition having positive dielectric anisotropy was prepared, and characteristics thereof were measured. NI=107.6° C.; Tc <−20° C.; Δn=0.111; Δε=10.6; Vth=1.55 V; η=19.4 mPa·s.

Compound (1-2) was added to the composition in a proportion of 0.1% by weight, and VHR-11 was measured. VHR-11=83.9%.

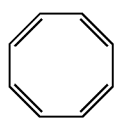

(1-2)

Example 9

| | | |
|---|---|---|
| 1-HHXB(F,F)—F | (2-4) | 7% |
| 3-HHXB(F,F)—CF3 | (2-5) | 12% |
| 3-GB(F,F)XB(F,F)—F | (2-14) | 8% |
| 3-GBB(F)B(F,F)—F | (2-22) | 3% |
| 4-GBB(F)B(F,F)—F | (2-22) | 3% |
| 3-HBBXB(F,F)—F | (2-23) | 3% |
| 5-HBBXB(F,F)—F | (2-23) | 5% |
| 4-GB(F)B(F,F)XB(F,F)—F | (2-27) | 5% |
| 5-GB(F)B(F,F)XB(F,F)—F | (2-27) | 5% |
| 3-HH—V | (3-1) | 22% |
| 3-HH—V1 | (3-1) | 10% |
| 3-HH—2V1 | (3-1) | 9% |
| V2—HHB-1 | (3-5) | 8% |

The above composition having positive dielectric anisotropy was prepared, and characteristics thereof were measured. NI=89.8° C.; Tc <−20° C.; Δn=0.092; Δε=11.5; Vth=1.47 V; η=17.0 mPa·s.

Compound (1-5) was added to the composition in a proportion of 0.03% by weight, and VHR-11 was measured. VHR-11=81.3%.

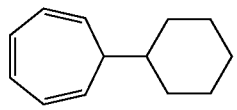

(1-5)

Example 10

| | | |
|---|---|---|
| 3-HHB(F,F)—F | (2-2) | 10% |
| 3-HHXB(F,F)—F | (2-4) | 3% |
| 3-GHB(F,F)—F | (2-7) | 4% |
| 3-BB(F)B(F,F)—F | (2-15) | 7% |
| 3-BB(F,F)XB(F,F)—F | (2-18) | 13% |

| | | |
|---|---|---|
| 3-GB(F)B(F)B(F)—F | (2-21) | 6% |
| 4-GB(F)B(F,F)XB(F,F)—F | (2-27) | 10% |
| 3-HH—V | (3-1) | 17% |
| 3-HH-4 | (3-1) | 11% |
| 5-HB—O2 | (3-2) | 3% |
| 3-HHB-1 | (3-5) | 5% |
| 3-HHB—O1 | (3-5) | 6% |
| 3-HHB-3 | (3-5) | 5% |

The above composition having positive dielectric anisotropy was prepared, and characteristics thereof were measured. NI=83.3° C.; Tc <−20° C.; Δn=0.103; Δε=10.8; Vth=1.36 V; η=21.2 mPa·s.

Compound (1-6) was added to the composition in a proportion of 0.03% by weight, and VHR-11 was measured. VHR-11=83.9%.

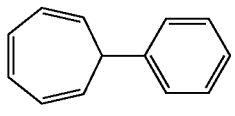

(1-6)

Example 11

| | | |
|---|---|---|
| 3-BB(F,F)XB(F,F)—F | (2-18) | 5% |
| 2-HHBB(F,F)—F | (2-19) | 2% |
| 3-HHBB(F,F)—F | (2-19) | 3% |
| 4-HHBB(F,F)—F | (2-19) | 4% |
| 4-BB(F)B(F,F)XB(F,F)—F | (2-29) | 4% |
| 5-BB(F)B(F,F)XB(F,F)—F | (2-29) | 2% |
| 3-BB(2F,3F)XB(F,F)—F | (2-32) | 5% |
| 3-HB—CL | (2) | 6% |
| 3-HHB—CL | (2) | 6% |
| 5-HHB—CL | (2) | 5% |
| 3-HH—V1 | (3-1) | 10% |
| 4-HH—V | (3-1) | 13% |
| 5-HH—V | (3-1) | 10% |
| V—HHB-1 | (3-5) | 13% |
| 2-BB(F)B-3 | (3-7) | 5% |
| 2-BB(F)B-5 | (3-7) | 4% |
| 5-HBB(F)B-2 | (3-13) | 3% |

The above composition having positive dielectric anisotropy was prepared, and characteristics thereof were measured. NI=102.2° C.; Tc <−20° C.; Δn=0.117; Δε=4.5; Vth=2.19 V; η=17.8 mPa·s.

Compound (1-2) was added to the composition in a proportion of 0.1% by weight, and VHR-11 was measured. VHR-11=80.8%.

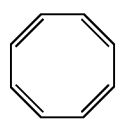

(1-2)

Example 12

| | | |
|---|---|---|
| 3-BB(F)B(F,F)—F | (2-15) | 6% |
| 3-BB(F,F)XB(F,F)—F | (2-18) | 18% |

-continued

| | | |
|---|---|---|
| 3-HBBXB(F,F)—F | (2-23) | 8% |
| 4-GB(F)B(F,F)XB(F)—F | (2-26) | 7% |
| 4-GB(F)B(F,F)XB(F,F)—F | (2-27) | 8% |
| 3-HH—V | (3-1) | 40% |
| V2—HHB-1 | (3-5) | 13% |

The above composition having positive dielectric anisotropy was prepared, and characteristics thereof were measured. NI=72.5° C.; Tc <−20° C.; Δn=0.104; Δε=10.2; Vth=1.49 V; η=14.6 mPa·s.

Compound (1-3) was added to the composition in a proportion of 0.1% by weight, and VHR-11 was measured. VHR-11=86.6%.

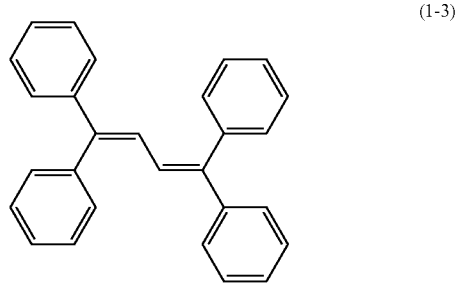 [SMILES: C(C=C(c1ccccc1)c1ccccc1)=C(c1ccccc1)c1ccccc1]
(1-3)

In Examples 1 to 3, an effect of addition of an additive component was compared. The voltage holding ratio (VHR-11) was measured according to a method described in measuring method (10) described above. First, a composition to which the additive component (ultraviolet light absorber) was not added was injected into a TN device. The device was irradiated with ultraviolet light of 5 mW/cm² for 167 minutes, and then the voltage holding ratio was measured. Next, a composition to which the additive component was added was injected into the TN device, and the device was irradiated with ultraviolet light in a similar manner, and then the voltage holding ratio was measured. The effect of the additive component was evaluated by comparing the measured values. The results were summarized in Table 4. In Examples 1 to 3, when the additive component was not added, the voltage holding ratio (VHR-11) was about 45%. VHR-11 was able to be controlled to about 74% by adding the additive component to the composition. In Examples 4 to 12, VHR-11 was in the range of 80.8% to 90.1%, and a high voltage holding ratio was able to be maintained. Thus, the liquid crystal composition of the invention can be concluded to have superb characteristics.

TABLE 4

Effect by addition of Additive component (Quencher)

| | Additive component | Voltage holding ratio before addition (VHR-11) | Voltage holding ratio after addition (VHR-11) |
|---|---|---|---|
| Example 1 | Compound (1-1) | 44.6% | 73.8% |
| Example 2 | Compound (1-2) | 49.3% | 74.5% |
| Example 3 | Compound (1-3) | 52.7% | 78.5% |

INDUSTRIAL APPLICABILITY

A liquid crystal display device including a liquid crystal composition of the invention has a short response time, a large voltage holding ratio, a large contrast ratio, a long service life and so forth, and thus can be used in a liquid crystal projector, a liquid crystal television and so forth.

What is claimed is:
1. A liquid crystal composition that has a nematic phase and positive dielectric anisotropy, and contains at least one quencher, which is at least one compound selected from the group of compounds represented by formula (1-1) to formula (1-6), as an additive component and at least one compound selected from the group of compounds represented by formula (2) as a first component:

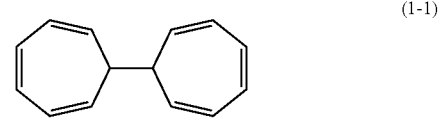
(1-1)

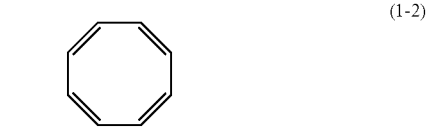
(1-2)

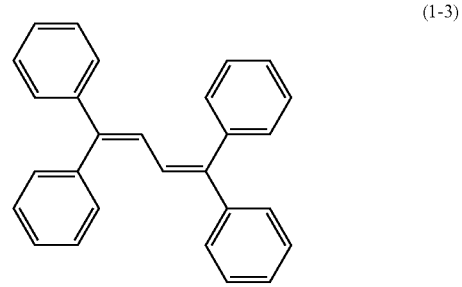 [SMILES: C(C=C(c1ccccc1)c1ccccc1)=C(c1ccccc1)c1ccccc1]
(1-3)

(1-4)

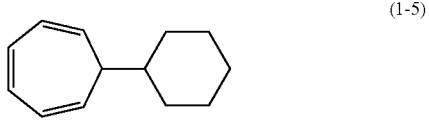
(1-5)

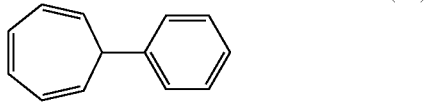
(1-6)

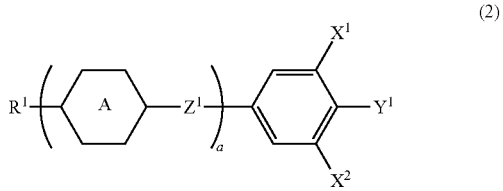
(2)

wherein, in formula (1-1) to formula (1-6), hydrogens on rings are not replaced or at least one hydrogen on a ring is replaced by fluorine, chlorine, alkyl having 1 to 12 carbons, alkoxy having 1 to 12 carbons, alkenyl having 2 to 12 carbons, or alkyl having 1 to 12 carbons in which at least one hydrogen is replaced by fluorine or chlorine, and in formula (2), $R^1$ is alkyl having 1 to 12 carbons, alkoxy having 1 to 12 carbons or alkenyl having 2 to 12 carbons; ring A is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, carbonyloxy or difluoromethyleneoxy; $X^1$ and $X^2$ are independently hydrogen or fluorine; $Y^1$ is fluorine, chlorine, alkyl having 1 to 12 carbons in which at least one hydrogen is replaced by fluorine or chlorine, alkoxy having 1 to 12 carbons in which at least one hydrogen is replaced by fluorine or chlorine, or alkenyloxy having 2 to 12 carbons in which at least one hydrogen is replaced by fluorine or chlorine; and a is 1, 2, 3 or 4.

2. The liquid crystal composition according to claim 1, wherein a proportion of the additive component is in the range of 0.005% by weight to 2% by weight based on a weight of the liquid crystal composition.

3. The liquid crystal composition according to claim 1, containing at least one compound selected from the group of compounds represented by formula (2-1) to formula (2-35) as the first component:

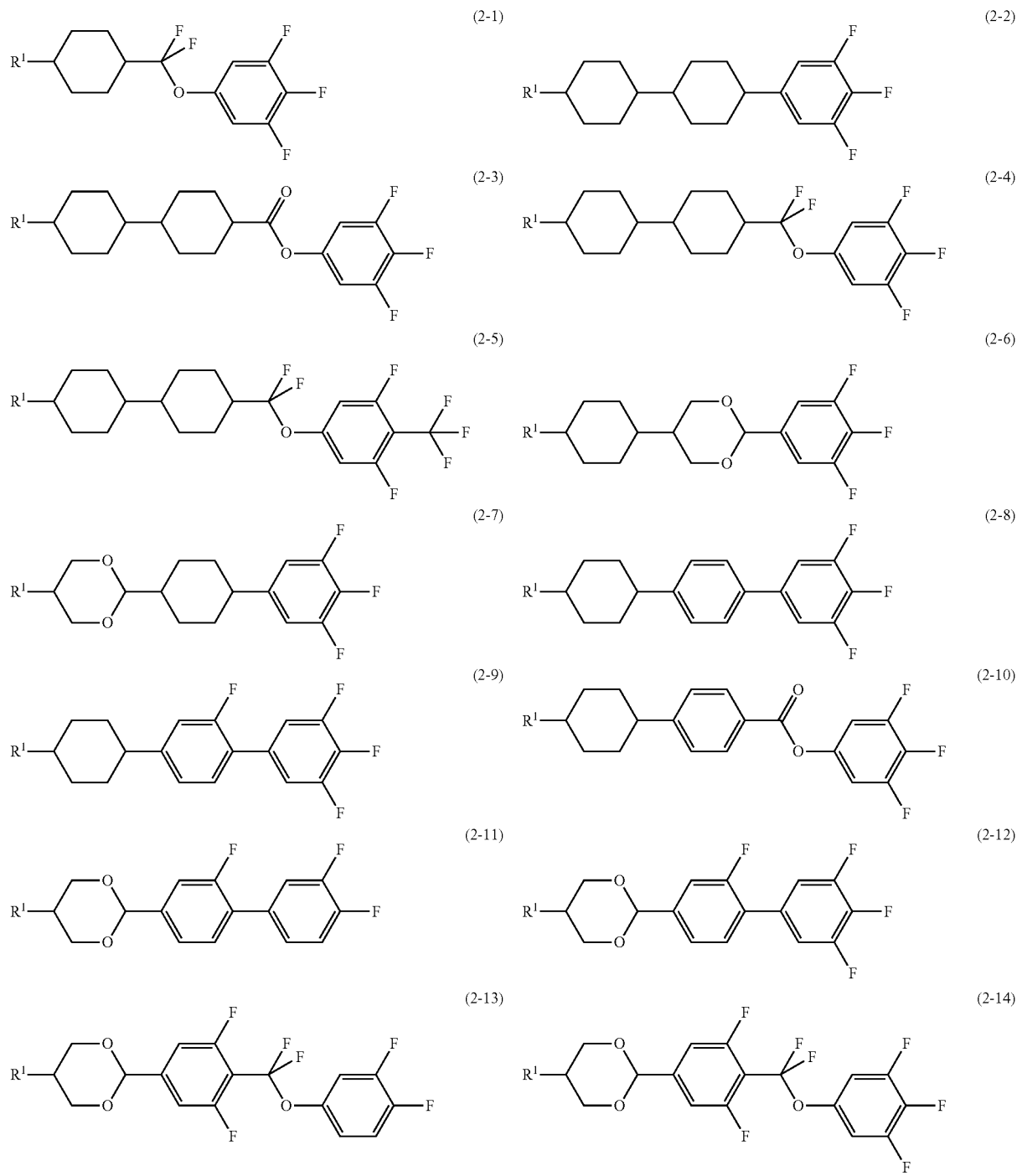

-continued
(2-15) 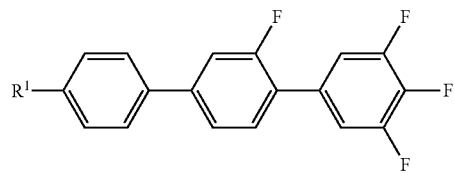
(2-16) 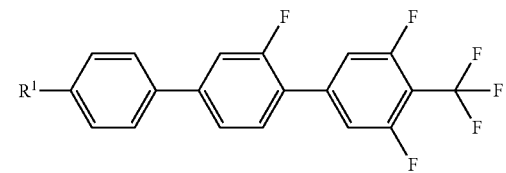
(2-17) 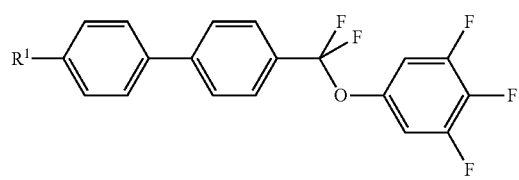
(2-18)
(2-19) 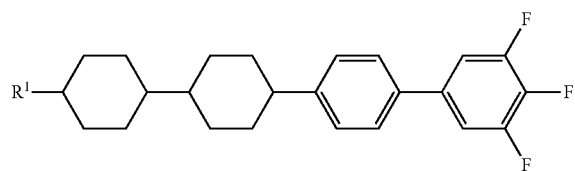
(2-20) 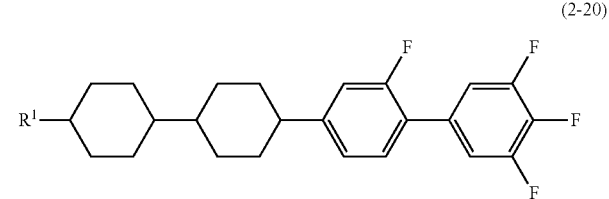
(2-21) 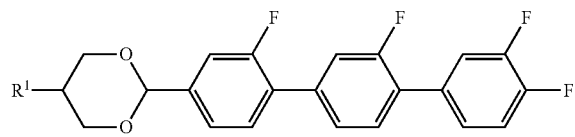
(2-22) 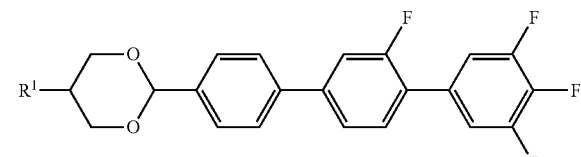
(2-23) 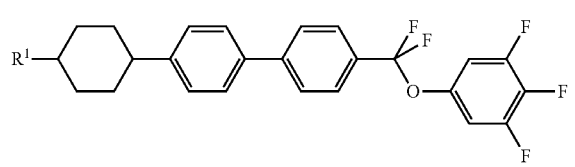
(2-24) 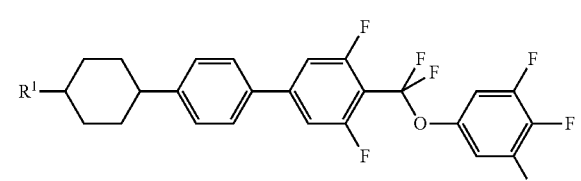
(2-25) 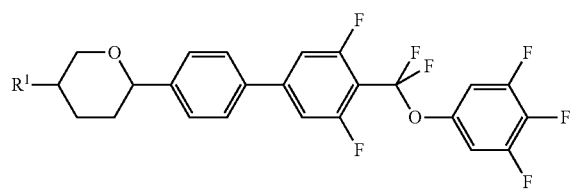
(2-26) 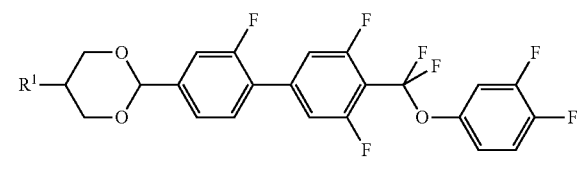
(2-27) 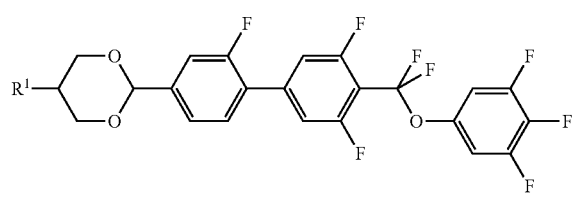
(2-28) 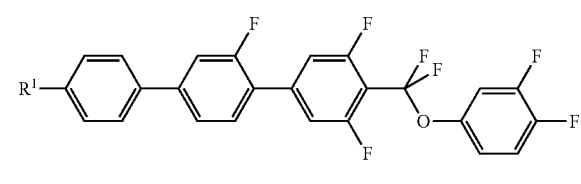

-continued (2-29)
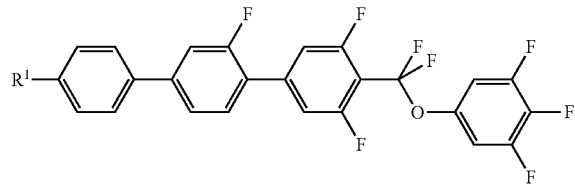

(2-30)
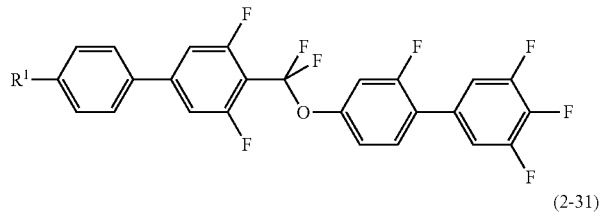

(2-31)
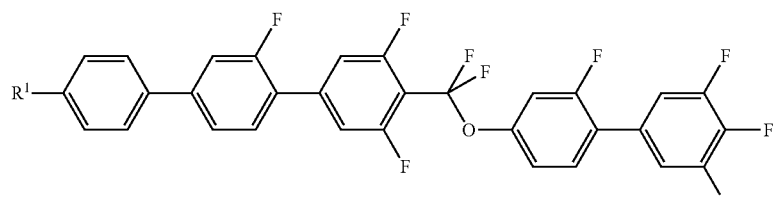

(2-32)
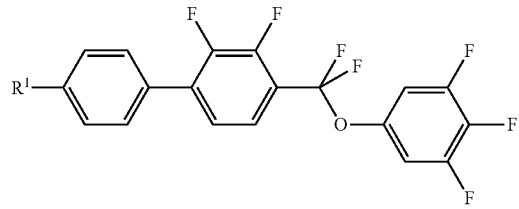

(2-33)
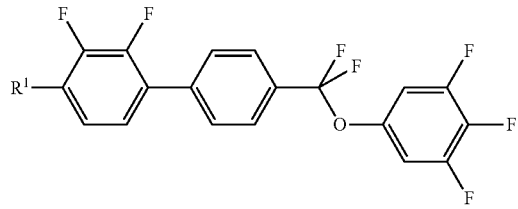

(2-34)
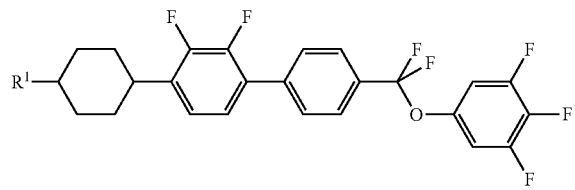

(2-35)
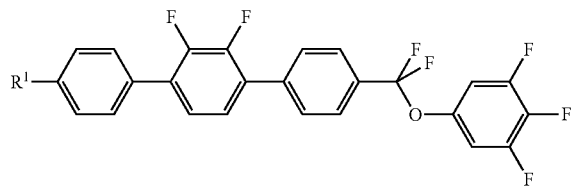

wherein, in formula (2-1) to formula (2-35), $R^1$ is alkyl having 1 to 12 carbons, alkoxy having 1 to 12 carbons or alkenyl having 2 to 12 carbons.

4. The liquid crystal composition according to claim 1, wherein a proportion of the first component is in the range of 10% by weight to 90% by weight based on a weight of the liquid crystal composition.

5. The liquid crystal composition according to claim 1, containing at least one compound selected from the group of compounds represented by formula (3) as a second component:

(3)
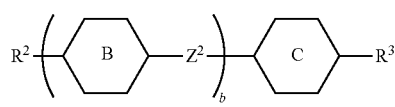

wherein, in formula (3), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; and b is 1, 2 or 3.

6. The liquid crystal composition according to claim 1, containing at least one compound selected from the group of compounds represented by formula (3-1) to formula (3-13) as a second component:

(3-1)
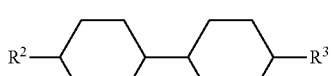

(3-2)
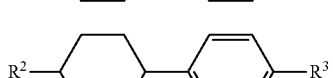

(3-3)
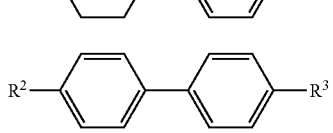

(3-4)
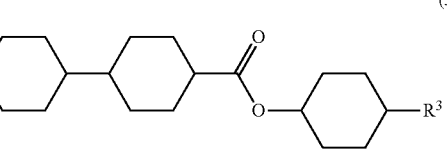

(3-5)
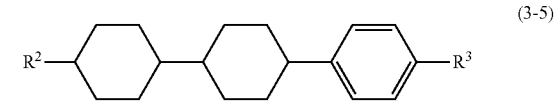

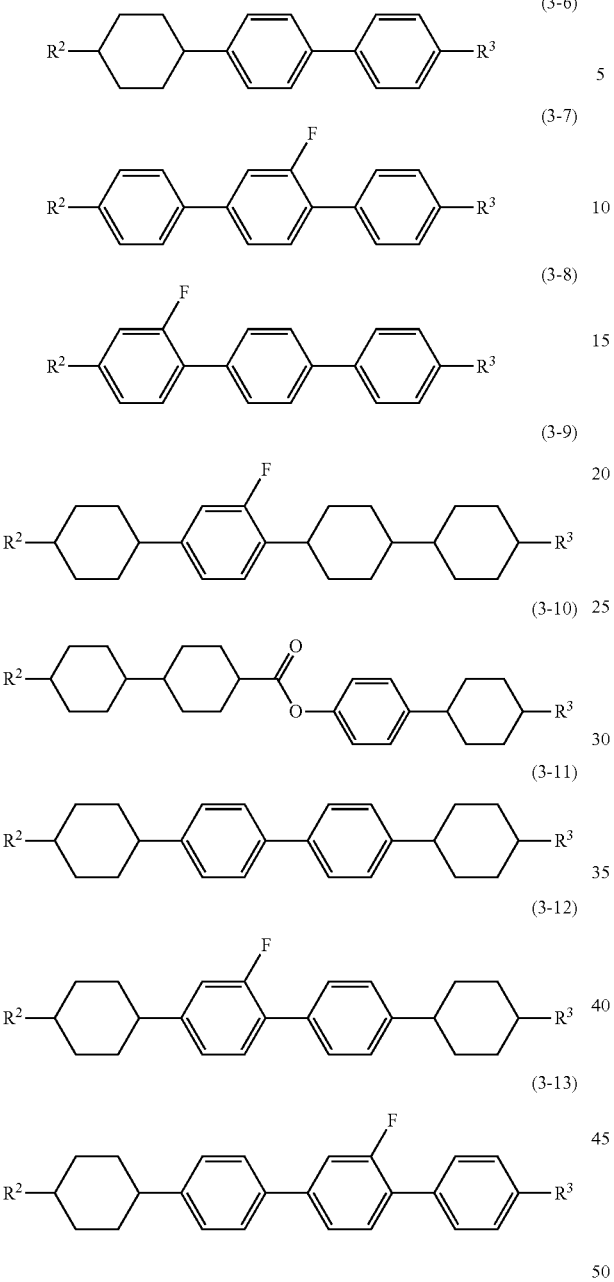

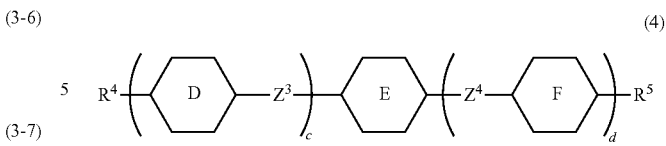

wherein, in formula (3-1) to formula (3-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

7. The liquid crystal composition according to claim 5, wherein a proportion of the second component is in the range of 10% by weight to 90% by weight based on a weight of the liquid crystal composition.

8. The liquid crystal composition according to claim 1, containing at least one compound selected from the group of compounds represented by formula (4) as a third component:

wherein, in formula (4), $R^4$ and $R^5$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring D and ring F are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

9. The liquid crystal composition according to claim 1, containing at least one compound selected from the group of compounds represented by formula (4-1) to formula (4-21) as a third component:

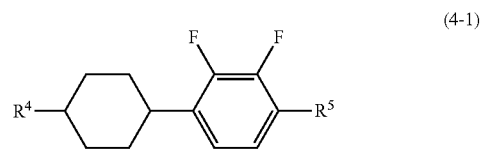

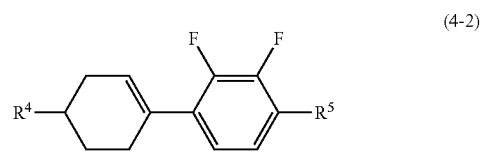

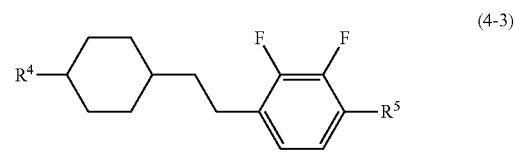

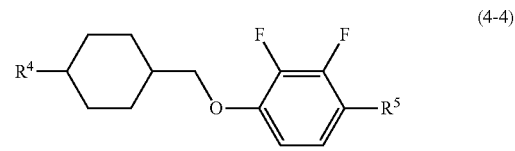

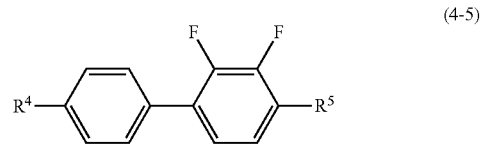

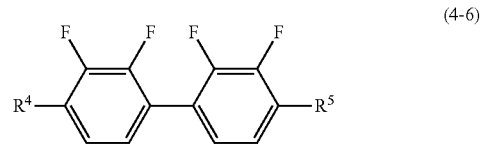

(4-7)
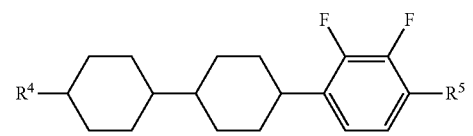

(4-8)
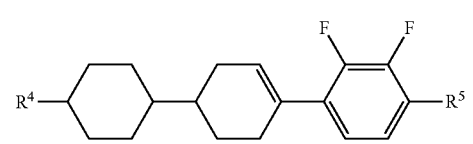

(4-9)
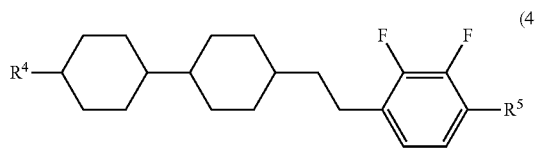

(4-10)
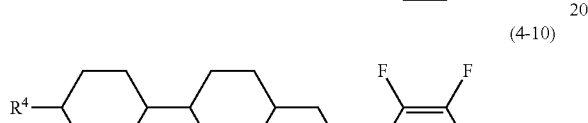

(4-11)
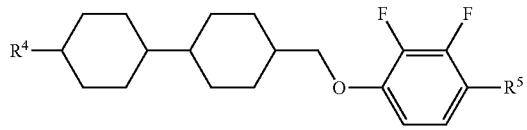

(4-12)
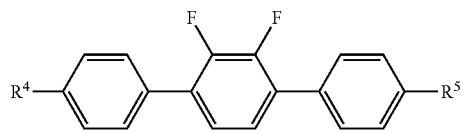

(4-13)
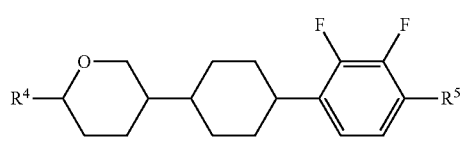

(4-14)
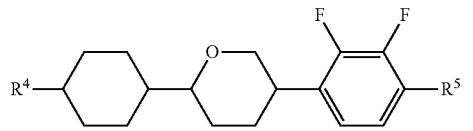

(4-15)
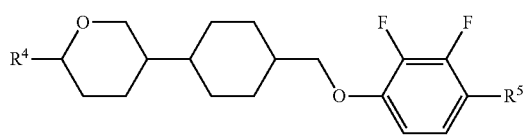

(4-16)
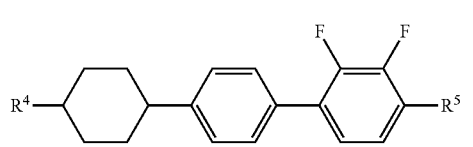

(4-16)
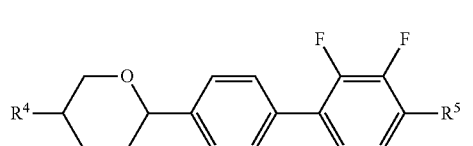

(4-17)
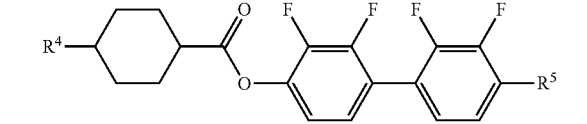

(4-18)
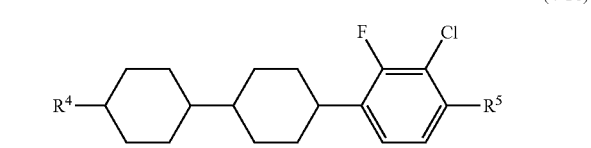

(4-19)
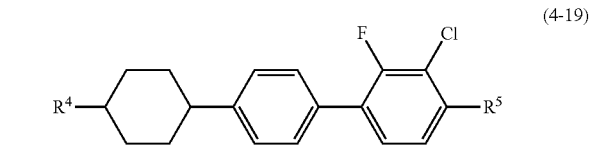

(4-20)
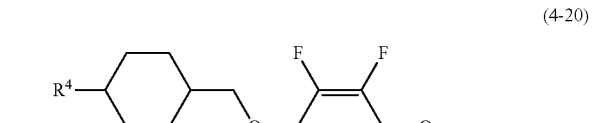

(4-21)
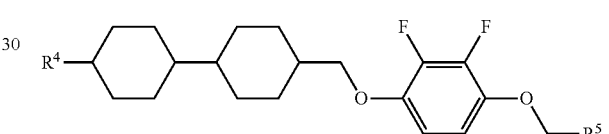

wherein, in formula (4-1) to formula (4-21), $R^4$ and $R^5$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine.

10. The liquid crystal composition according to claim 8, wherein a proportion of the third component is in the range of 3% by weight to 25% by weight based on a weight of the liquid crystal composition.

11. The liquid crystal composition according to claim 1, wherein a maximum temperature of a nematic phase is 70° C. or more, an optical anisotropy (measured at 25° C.) at a wavelength of 589 nanometers is 0.07 or more, and a dielectric anisotropy (measured at 25° C.) at a frequency of 1 kHz is 2 or more.

12. A liquid crystal display device, including the liquid crystal composition according to claim 1.

13. The liquid crystal display device according to claim 12, wherein an operating mode in the liquid crystal display device includes a TN mode, an ECB mode, an OCB mode, an IPS mode, an FFS mode or an FPA mode, and a driving mode in the liquid crystal display device includes an active matrix mode.

14. The liquid crystal composition according to claim 5, containing at least one compound selected from the group of compounds represented by formula (4) as a third component:

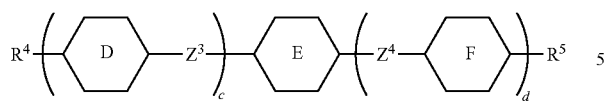

(4)

wherein, in formula (4), $R^4$ and $R^5$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring D and ring F are independently 1,4-cyclohexylene, 1,4-cyclohexenylene, 1,4-phenylene, 1,4-phenylene in which at least one hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

* * * * *